United States Patent
Chen et al.

(10) Patent No.: US 10,868,337 B2
(45) Date of Patent: Dec. 15, 2020

(54) CELL-CORE FOR LITHIUM SLURRY BATTERY, AND LITHIUM SLURRY BATTERY MODULE

(71) Applicants: BEIJING HAWAGA POWER STORAGE TECHNOLOGY COMPANY LTD., Beijing (CN); HEBEI MAYJOY BATTERY COMPANY LTD., Hebei (CN)

(72) Inventors: Yongchong Chen, Beijing (CN); Yingyuan He, Beijing (CN); Xiaohu Zhang, Beijing (CN); Bin Zhang, Beijing (CN); Caimei Feng, Beijing (CN); Yanping Zhang, Beijing (CN); Ping Zhang, Beijing (CN)

(73) Assignees: BEIJING HAWAGA POWER STORAGE TECHNOLOGY COMPANY LTD, Beijing (CN); HEIBEI MAY JOY BATTERY COMPANY LTD., Heibei (CN)

( * ) Notice: Subject to any disclaimer, the term of this patent is extended or adjusted under 35 U.S.C. 154(b) by 175 days.

(21) Appl. No.: 16/082,838

(22) PCT Filed: Mar. 8, 2017

(86) PCT No.: PCT/CN2017/075925
§ 371 (c)(1),
(2) Date: Sep. 6, 2018

(87) PCT Pub. No.: WO2017/152836
PCT Pub. Date: Sep. 14, 2017

(65) Prior Publication Data
US 2019/0088981 A1 Mar. 21, 2019

(30) Foreign Application Priority Data

Mar. 8, 2016 (CN) .......................... 2016 1 0128524
Aug. 1, 2016 (CN) .......................... 2016 1 0620726
(Continued)

(51) Int. Cl.
*H01M 2/12* (2006.01)
*H01M 10/058* (2010.01)
(Continued)

(52) U.S. Cl.
CPC ....... *H01M 10/058* (2013.01); *H01M 2/0456* (2013.01); *H01M 2/36* (2013.01);
(Continued)

(58) Field of Classification Search
CPC ............. H01M 10/058; H01M 10/052; H01M 10/0585; H01M 10/0525; H01M 2/0456;
(Continued)

(56) References Cited

U.S. PATENT DOCUMENTS 4,042,760 A 8/1977 Land
2010/0068605 A1 3/2010 Harris et al.
(Continued)

FOREIGN PATENT DOCUMENTS

CA 983103 A 2/1976
CN 1251215 A 4/2000
(Continued)

OTHER PUBLICATIONS

Office Action dated Jul. 26, 2019 for Chinese Application No. 201610620726.4, 12 pages.
(Continued)

*Primary Examiner* — Jane J Rhee
(74) *Attorney, Agent, or Firm* — Patterson Thuente Pedersen, P.A.

(57) ABSTRACT

Provided is a no-liquid cell-core for a lithium slurry battery. The no-liquid cell-core comprises multiple positive elec-
(Continued)

trode pieces and negative electrode pieces overlapping alternately. The positive electrode piece comprises an electric-conductive cathode layer and a cathode surface current-collecting layer, wherein the electric-conductive cathode layer contains a part or all of the electric-conductive cathode particles in accumulated state without adhesive bonding, and the cathode surface current-collecting layer is set on the surface of the electric-conductive cathode layer and contacted with it tightly. The negative electrode piece comprises an electric-conductive lithium-intercalatable anode layer which is a lithium-containing metal body and/or a layer containing a part or all of electric-conductive lithium-intercalatable anode particles in accumulated state without adhesive bonding. The peripheral edges of the positive electrode piece and/or the negative electrode piece are insulated and sealed. A lithium slurry battery module containing the no-liquid cell-core is also provided.

37 Claims, 11 Drawing Sheets

(30) Foreign Application Priority Data

| | | |
|---|---|---|
| Aug. 1, 2016 | (CN) | 2016 1 0621508 |
| Dec. 23, 2016 | (CN) | 2016 1 1202373 |
| Jan. 22, 2017 | (CN) | 2017 1 0053604 |
| Jan. 23, 2017 | (CN) | 2017 1 0058336 |
| Jan. 23, 2017 | (CN) | 2017 1 0058490 |

(51) Int. Cl.

| | |
|---|---|
| *H01M 2/36* | (2006.01) |
| *H01M 2/04* | (2006.01) |
| *H01M 10/052* | (2010.01) |
| *H01M 10/0585* | (2010.01) |
| *H01M 4/13* | (2010.01) |
| H01M 10/0525 | (2010.01) |
| H01M 4/72 | (2006.01) |
| H01M 4/40 | (2006.01) |
| H01M 4/66 | (2006.01) |
| H01M 2/10 | (2006.01) |
| H01M 4/74 | (2006.01) |
| H01M 4/134 | (2010.01) |
| H01M 4/04 | (2006.01) |
| H01M 4/38 | (2006.01) |
| H01M 4/02 | (2006.01) |

(52) U.S. Cl.
CPC ........... *H01M 2/362* (2013.01); *H01M 2/364* (2013.01); *H01M 4/13* (2013.01); *H01M 10/052* (2013.01); *H01M 10/0585* (2013.01); H01M 2/1077 (2013.01); H01M 2/1229 (2013.01); H01M 2/1252 (2013.01); H01M 4/048 (2013.01); H01M 4/134 (2013.01); H01M 4/382 (2013.01); H01M 4/405 (2013.01); H01M 4/661 (2013.01); H01M 4/72 (2013.01); H01M 4/74 (2013.01); H01M 4/747 (2013.01); H01M 10/0525 (2013.01); H01M 2004/021 (2013.01)

(58) Field of Classification Search
CPC ...... H01M 2/36; H01M 2/362; H01M 2/1077; H01M 2/1229; H01M 2/1252; H01M 4/13; H01M 4/048; H01M 4/134; H01M 4/382; H01M 4/405; H01M 4/72; H01M 4/74; H01M 4/747; H01M 2004/021
See application file for complete search history.

(56) References Cited

U.S. PATENT DOCUMENTS

| | | |
|---|---|---|
| 2011/0086249 A1 | 4/2011 | Timmons |
| 2012/0114986 A1 | 5/2012 | Kim et al. |
| 2013/0055559 A1 | 3/2013 | Slocum et al. |
| 2013/0252092 A1 | 9/2013 | Huang |
| 2015/0093629 A1 | 4/2015 | Sayre et al. |
| 2016/0329569 A1 | 11/2016 | Chen et al. |

FOREIGN PATENT DOCUMENTS

| | | |
|---|---|---|
| CN | 1870326 A | 11/2006 |
| CN | 101872881 A | 10/2010 |
| CN | 102044722 A | 5/2011 |
| CN | 102263206 A | 11/2011 |
| CN | 102315454 A | 1/2012 |
| CN | 102473863 A | 5/2012 |
| CN | 102610830 A | 7/2012 |
| CN | 103094619 A | 5/2013 |
| CN | 104040764 A | 9/2014 |
| CN | 104701504 A | 6/2015 |
| CN | 104779402 A | 7/2015 |
| CN | 104795583 A | 7/2015 |
| CN | 105186006 A | 12/2015 |
| CN | 105280942 A | 1/2016 |
| CN | 204946946 U | 1/2016 |
| CN | 105449251 A | 3/2016 |
| CN | 106159302 A | 11/2016 |
| CN | 107171018 A | 9/2017 |
| CN | 107681115 A | 2/2018 |
| EP | 1 018 775 A1 | 7/2000 |
| JP | S 52147737 A | 12/1977 |
| JP | S 5631069 B2 | 7/1981 |
| JP | 2010218986 A | 9/2010 |
| JP | 2014056799 A | 3/2014 |
| KR | 20130046999 A | 5/2013 |
| WO | WO 2013/065942 A1 | 5/2013 |
| WO | WO 2013/093044 A1 | 6/2013 |
| WO | WO 2016/205663 A1 | 12/2016 |

OTHER PUBLICATIONS

Office Action dated Jul. 25, 2019 for Chinese Application No. 201710058336.7, 10 pages.
Office Action dated Aug. 5, 2019 for Chinese Application No. 201710058490.4, 2 pages.
First Office Action dated Dec. 24, 2018 for Chinese Application No. 201610128524.8, 8 pages.
Second Office Action dated Apr. 30, 2020 for Chinese Application No. 201710053604.6, 24 pages.
First Office Action dated Jul. 26, 2019 for Chinese Application No. 201610621508.2, 20 pages.
First Office Action dated Nov. 22, 2019 for Chinese Application No. 201611202373.2, 22 pages.
International Search Report for Application No. PCT/CN2017/075925, dated Jun. 16, 2017 (Original Search Report—4 pgs, English translation—2 pgs) (6 pgs total).

CELL-CORE FOR LITHIUM SLURRY BATTERY, AND LITHIUM SLURRY BATTERY MODULE

CROSS REFERENCE TO RELATED APPLICATIONS

This application is a US National Phase application based upon PCT Application No. PCT/CN2017075925, filed Mar. 8, 2017, which claims the priorities of: 1) Chinese Patent Application No. 201610128524.8, filed on Mar. 8, 2016; 2) Chinese Patent Application No. 201610620726.4, filed on Aug. 1, 2016; 3) Chinese Patent Application No. 201610621508.2, filed on Aug. 1, 2016; 4) Chinese Patent Application No. 201611202373.2, filed on Dec. 23, 2016; 5) Chinese Patent Application No. 201710053604.6, filed on Jan. 22, 2017; 6) Chinese Patent Application No. 201710058336.7, filed on Jan. 23, 2017; 7) Chinese Patent Application No. 201710058490.4, filed on Jan. 23, 2017; and the disclosures of which are hereby incorporated by reference.

FIELD

The present disclosure relates to the field of electrochemical power battery technology, specifically to a cell for a lithium slurry battery and a module thereof.

BACKGROUND

Lithium-ion battery is a new-type high-energy battery that uses a lithium-intercalation compound as the positive and negative materials, which has many advantages such as high specific energy, high voltage, low self-discharge, good cycle performance and long service life. At present, manufacture of the lithium-ion pole piece is usually carried out by coating, solvent drying, rolling and the like. The process is complicated, and the resultant pole piece has a relatively thin thickness (not more than 300 μm on one side), and the electrode active material carried on the unit area is limited. Moreover, once the electrode material is detached from the current collector and loses electrical connection during battery use, the performance of the battery will significantly deteriorate. The problems of efficiency and cost of lithium-ion batteries when used in the field of electric vehicles and large-scale energy storage raise higher demands on the capacity of battery cell. In addition, due to the influence of the electrode material structure, electrolyte properties, etc., side reactions may occur during the use of lithium-ion batteries, resulting in the consumption of electrolyte and active lithium, and the formation and unstable changes of the SEI film on the surface of the electrode material and the current collector. They may cause problems such as battery swelling, internal resistance increasing and so on, and the design of conventional lithium-ion battery structures is difficult to solve such problems.

Patent documents U.S. Pat. Nos. 5,792,576, 5,837,397 and WO0057504 provide a lithium slurry battery and a method for preparing the same, the positive electrode and negative electrode of which is paste-state that contains 20% to 40% of electrolyte. Dry electrode materials and conductive agent are firstly dry mixed, and then electrolyte is gradually added in stages. After mixing, a slurry-like electrode paste is formed. Thereafter, the paste is filled in the frame on the current collector by method of extrusion or smearing, and covered with a membrane. The current collector, membrane and the frame edges are combined together with a binder and are sealed by hot pressing. Due to the strength of the paste-state electrode in the battery is relatively low, the cell of the battery can hardly meet the high capacity requirements of electric vehicles and large-scale energy storage. In addition, patent documents CN103247779A and CN1901255A indicate that adding 3D porous current collecting matrix such as foamed aluminum and so on as a support can improve the strength and thickness of the electrode and realize large-capacity output of cell of the battery.

In addition, due to the conventional lithium-ion battery is a liquid-encapsulated high-energy-density device product, if the product is subjected to external force impact or improper protection of the positive and negative tabs during transportation, it may be in a risk of ignition and explosion caused by short-circuit. Therefore, the problems of storage and transportation of lithium-ion batteries are in urgent to be solved.

SUMMARY

In order to solve the above problems, the present disclosure provides a lithium slurry battery module and an no-liquid cell-core therefor. In the no-liquid cell-core for lithium slurry battery, the electric-conductive cathode layer of the positive electrode contains a part or all of electric-conductive cathode particles in accumulated state without adhesive bonding, and/or the negative electrode piece lithium-intercalatable conductive layer of the negative electrode piece contains a part or all of electric-conductive lithium-intercalatable anode particles in accumulated state without adhesive bonding. During the transportation and storage, the lithium slurry battery may be in no-liquid state, and the electrolyte is injected into the lithium slurry battery before using. After the injection of electrolyte, conductive slurry is formed in the positive electrode piece and/or negative electrode piece of the lithium slurry battery, and the conductive slurry contains a certain proportion of conductive particles that suspend or deposit in the electrolyte. When the battery is subjected to impact or concussion of external force, since the conductive particles are not bonded and fixed, they can move in the electrolyte and form a dynamic conductive net. Rheological conductive slurry can avoid problems of reducing cycle life and so on caused by falling or loose of the electrode material.

The technical solution provided by the present disclosure is as described hereinafter.

A no-liquid cell-core for a lithium slurry battery, which comprises several positive electrode pieces and negative electrode pieces that overlapped alternately. The positive electrode piece comprises a positive electrode grid, electric-conductive cathode particles and a cathode surface current-collecting layer. The positive electrode grid is a rigid or flexible supporting body which has one or more independent grid units. The grid unit is a through-hole or a recess-like blind-hole. The electric-conductive cathode particles are filled in the grid unit of the positive electrode grid to form an electric-conductive cathode layer. The electric-conductive cathode layer contains a part or all of electric-conductive cathode particles in accumulated state without adhesive bonding. The accumulated state includes powders accumulation, pressed sheet or pressed block, and the electric-conductive cathode particles are compounds or mixtures of the cathode active materials and conductive agents. The cathode surface current-collecting layer is fixed to the surface of the positive electrode grid, and the fixing manner includes adhesive bonding, mechanical pressing, coating, hot pressing, welding and so on. The negative electrode piece comprises an electric-conductive lithium-intercalatable anode layer. The electric-conductive lithium-intercalatable anode layer is a lithium-containing metal body and/or contains a part or all of electric-conductive lithium-intercalatable anode particles in accumulated state without adhesive bonding. The accumulated state includes powders accumulation, pressed sheet and pressed block, and the electric-conductive lithium-intercalatable anode particles are compounds or mixtures of lithium-intercalatable anode material and conductive agent. The peripheral edge of the positive electrode piece and/or negative electrode piece is insulated and sealed. That is, the present disclosure provides a no-liquid cell-core, when the electrolyte is not injected, the whole no-liquid cell-core that comprises the positive electrode piece and the negative electrode piece is in dry state. The electrolyte is injected when the battery is being used so that the electric-conductive cathode particles in accumulated state without adhesive bonding and the electric-conductive lithium-intercalatable anode particles in accumulated state without adhesive bonding in the positive electrode piece and the negative electrode piece independently form a positive electrode slurry and a negative electrode slurry, and activate the battery, so that the battery is easy for storage and transportation. Herein, the electric-conductive cathode particles and the electric-conductive lithium-intercalatable anode particles in the accumulated state can be loosely accumulated powder. Preferably, in a state of pressed sheet or pressed block, the electric-conductive cathode particles and the electric-conductive lithium-intercalatable anode particles are tightly pressed by pressure, so as to improve the conductive performance between the positive electrode conductive particles and between the electric-conductive lithium-intercalatable anode particles, decrease the internal resistance and increase the battery performances. The cathode surface current-collecting layer is fixed to the grid unit-disposed surface of the positive electrode grid, and is tightly contacted with the electric-conductive cathode layer and the positive electrode grid. In addition, the cathode surface current-collecting layer is adjacent to the separating layer or the separating space between the positive electrode and the negative electrode so as to decrease the current collecting internal resistance of the battery. From the perspective of the polarization internal resistance, the smaller the space between the current collecting layer and the separating space or the separating layer is, the more favorable it is for decreasing the current collection internal resistance. If the space is unduly large, the conductive distance of the electrons and the ions in the electrode slurry is increased, making the internal resistance of the battery increase and the charge-discharge conversion efficiency decrease. Moreover, the cathode surface current-collecting layer also plays a role of leakage preventing, prevents the positive electrode conductive material in the electric-conductive cathode layer from dropping off, influences the performance of the battery, and helps ensure the flatness of the pole piece surface. The positive electrode grid can be a rigid supporting body or a flexible supporting body, which plays a role of holding the electric-conductive cathode particles without adhesive bonding through the grid units of the positive electrode grid. That is, it restricts the electric-conductive cathode particles without adhesive bonding which do not have a fixed shape to prevent them from leaking from the perimeter. Preferably, there are multiple independent grid units disposed in the positive electrode grid, and the electric-conductive cathode particles in the grid units do not move therebetween. That is, the grid units keep the electric-conductive cathode particles in the grid units, and this structure divide a grid unit into several independent multi-grids structure from a whole piece of single-grid structure. When the pole piece has a relatively large area and thick thickness, due to the whole electrode area is divided into several relatively small spaces, it solves the slurry precipitation problem of thick pole piece with large area and takes the need of high-current current collection and pole piece flatness of the battery into consideration as well. The lithium-intercalatable conductive layer of the negative electrode piece is selected from the group consisting of lithium-containing metal body and electric-conductive lithium-intercalatable anode particles in an accumulated state, or a mixture thereof. When the lithium-intercalatable conductive layer merely comprises electric-conductive lithium-intercalatable anode particles in accumulated state, leakage preventing layers that prevent the negative electrode lithium-intercalatable particles from leaking out can be provided on both sides of the lithium-intercalatable conductive layer. The material of the leakage preventing layer can be conductive material or insulation material, as long as it prevents the negative electrode lithium-intercalatable particles from leaking out and allows ions to get through. The insulation sealing around the positive electrode and/or the negative electrode can be realized with an insulation frame, or can be realized through other technical means in the art.

A separating space is provided between the positive electrode piece and the negative electrode piece. The separating space has a height of 0.01 mm to 1 mm, and preferably from 0.1 mm to 1 mm. In the no-liquid cell-core, the separating space is an empty chamber. After injecting electrolyte to the battery, the separating space is filled with electrolyte. When the separating space has a height of 0.01 mm, the positive electrode and the negative electrode are separated by the electrolyte in the separating space, so a contact short circuit is hard to happen. The separating space avoids tight contact between the positive and negative electrode pieces and the separating layer. Through periodically replacing the electrolytes in the battery, it can efficiently decrease polarization of the battery, extend the service life of the battery and improve the safety of the battery.

One or more separating layers can be disposed in the separating space, and the separating layer provides an electron-insulated separation between the positive electrode piece and the negative electrode piece. The separating layer is fixed to the surface of the positive electrode piece and/or the negative electrode piece. The fixing manner includes adhesive bonding, mechanical pressing, coating, hot pressing, welding and so on. Or, the separating layer is clamped between the positive electrode piece and the negative electrode piece. Or, the separating layer wraps on the surface of the positive electrode piece and/or the negative electrode piece. The material of the separating layer is an electric-insulating porous polymer material; or, the material of the separating layer is an electric-insulating porous material composed of inorganic nonmetal material and organic polymer; or, the material of the separating layer is an electric-insulating gel polymer electrolyte composite material composed of a polymer matrix, a liquid organic plasticizer and a lithium salt; or, the material of the separating layer is an electric-insulating porous polymer material or a porous polymer material composed of an inorganic nonmetal material and an organic polymer, and the pores thereof are filled with ion-conductive electrolyte or polymer colloidal material, and so on.

In the no-liquid cell-core, the electric-conductive cathode particles without adhesive bonding and/or the electric-conductive lithium-intercalatable anode particles without adhesive bonding have an accumulation porosity of more than 5% and less than 60%. When immerging in electrolyte, the electric-conductive cathode particles without adhesive bonding and/or electric-conductive lithium-intercalatable anode particles without adhesive bonding can move in the electrolyte and independently form a positive electrode slurry and/or a negative electrode slurry. The electric-conductive cathode particles may account for from 10% to 90% of the mass of the positive electrode slurry, and preferably from 15% to 80%. The electric-conductive lithium-intercalatable anode particles may account for from 10% to 90% of the mass of the negative electrode slurry, and preferably from 15% to 80%. The electric-conductive cathode particles have a mean particle diameter of 0.05 to 500 μm, and the mass ratio of the cathode active material to the conductive agent is 20 to 98:80 to 2; and the electric-conductive lithium-intercalatable anode particles have a mean particle diameter of 0.05 to 500 μm, and the mass ratio of the lithium-intercalatable anode material to the conductive agent is 20 to 98:80 to 2.

The cathode active material may be selected from the group consisting of lithium iron phosphate, lithium manganese phosphate, lithium silicate, lithium iron silicate, sulfate compounds, sulfur carbon composite, sulfur, titanium sulfur compounds, molybdenum sulfur compounds, iron sulfur compounds, lithium-doped manganese oxide, lithium cobalt oxide, lithium titanium oxide, lithium vanadium oxide, lithium nickel manganese oxide, lithium nickel cobalt oxide, lithium nickel cobalt aluminum oxide, lithium nickel aluminum oxide, lithium nickel cobalt manganese oxide and lithium iron nickel manganese oxide, or a mixture thereof.

The lithium-intercalatable anode material may be selected from the group consisting of aluminum-based alloy, silicon-based alloy, tin-based alloy, lithium titanium oxide, lithium silicon oxide, metal lithium powder and graphite, or a mixture thereof, in which lithium can be embedded.

The conductive agent may be selected from the group consisting of carbon black, Ketjenblack, graphene, carbon nanotube, carbon fiber, amorphous carbon, metal conductive particle and metal conductive fiber, or a mixture thereof. And the material of the metal conductive particle or fiber can be aluminum, stainless steel, silver and so on.

The material of the lithium-containing metal body is metal lithium or lithium-based alloy. The thickness of the lithium-containing metal body is preferably from 0.001 to 2 mm. The lithium-containing metal body has a single-layer structure or a multi-layer structure. The lithium-based alloy is Li—Al, Li—Si, Li—Mg, Li—Sn, Li—Bi, Li—Sb and so on. It is a binary, a ternary or a multi-nary alloy. The alloy comprises elements such as Mg, Ca, Al, Si, Ge, Sn, Pb, As, Sb, Bi, Pt, Ag, Au, Zn, Cd, Hg and so on, which can form solid solution with lithium and/or perform addition reaction with lithium, wherein the content of the non-lithium element is not more than 50%. When the lithium-containing metal body has a multi-layer structure, the material of each layer can be the same or not.

The positive electrode piece in the no-liquid cell-core of the lithium slurry battery will be described in details hereinafter.

In the positive electrode piece, the positive electrode grid has a thickness of 0.5 to 20 mm. The shape of the grid unit is circular, square, oval, rhombus, polygon or other irregular shapes. The volume ratio of all the grid units accounts for 50% to 98% of the volume of the positive electrode grid, and more preferably from 70% to 98%. All the grid units are regularly or irregularly arranged on the surface of the bus grid. The material of the positive electrode can be an electron nonconductive material, and the electron nonconductive material is selected from the group consisting of polyethylene, polypropylene, polystyrene, polytetrafluoroethylene, polyterephthalate, polyamide, polyimide, polyether nitrile, polymethyl acrylate, polyvinylidene fluoride and modified polyolefin, or a mixture thereof. Or the material of the positive electrode grid can be conductive metal, and the conductive metal is selected from the group consisting of aluminum, stainless steel and silver, or a mixture thereof. Or the material of the positive electrode grid is conductive polymer material, and the conductive polymer material is selected from the group consisting of polyacetylene, polypyrrole and its derivatives, polythiophene and its derivatives, polyaniline and its derivatives, poly-(p-phenylene vinylene) and its derivatives, polyparaphenylene and its derivatives and polyfluorene and its derivatives, or a mixture thereof. The material of the positive electrode grid is a composite or mixture of the conductive agent and polymer matrix material, the polymer matrix material is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, sodium carboxymethyl cellulose, modified polyolefin, polyacetylene, polypyrrole and its derivatives, polythiophene and its derivatives, polyaniline and its derivatives, poly-(p-phenylene vinylene) and its derivatives, polyparaphenylene and its derivatives and polyfluorene and its derivatives, or a mixture thereof. Therein, mass percentage of the conductive agent is from 10% to 95%, and preferably from 40% to 95. The conductive agent is selected from the group consisting of carbon black, Ketjenblack, graphene, carbon nanotube, carbon fiber, amorphous carbon, metal conductive particle and metal conductive fiber, or a mixture thereof. The material of the metal conductive particle or the metal conductive fiber is aluminum, stainless steel or silver. Or the material of the positive electrode grid is polymer material plated with a conductive metal plating layer. The conductive metal plating layer is selected from the group consisting of aluminum, stainless steel and silver, or a mixture thereof. The polymer material is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, sodium carboxymethyl cellulose, modified polyolefin, polyacetylene, polypyrrole and its derivatives, polythiophene and its derivatives, polyaniline and its derivatives, poly-(p-phenylene vinylene) and its derivatives, polyparaphenylene and its derivatives and polyfluorene and its derivatives, or a mixture thereof. Or, the material of the positive electrode grid is selected from the group consisting of flexible conductive metal fabric, carbon blanket, carbon fiber conductive fabric and electric-conductive felt composed of metal wires and organic fibers. The material of the conductive metal and metal wire is selected from the group consisting of aluminum, aluminum alloy, stainless steel, silver, and so on. The organic fiber is selected from the group consisting of natural cotton and linen, dacron, aramid, nylon, polypropylene fiber, polyethylene and polytetrafluoroe thylene, or a mixture thereof. Or, the material of the positive electrode grid is selected from the group consisting of flexible metal-wire woven conductive layer, conductive blanket made from metal wire and organic fiber, inorganic non-metal material and porous organic material, each of the above materials which is coated with an electric-conductive coating layer or plated with a metal thin film on the surface. The conductive coating layer is a mixture of the conductive agent and a binder, or the conductive coating layer is a mixture of the conductive agent, cathode active material and the binder. The mixing manner is selected from the group consisting of bonding, spraying, evaporation deposition, mechanical pressing and so on. The porous organic material includes natural cotton and linen, dacron, aramid, nylon, polypropylene fiber, polyethylene, polytetrafluoroethylene and so on. The inorganic non-metal material includes glass fiber nonwoven fabric, ceramic fiber paper, and so on. The conductive agent is selected from the group consisting of carbon black, Ketjenblack, graphene, carbon nanotube, carbon fiber, amorphous carbon, metal conductive particle and metal conductive fiber, or a mixture thereof. The material of the metal conductive particle or the metal conductive fiber is aluminum, stainless steel, silver, and so on. The binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof. This multi-grid structure solves the slurry precipitation problem of thick pole piece with large area, supports the large-area relatively thick electric-conductive cathode particles in accumulated state, and ensures the flatness of the pole piece. In addition, when the material of the positive electrode piece is conductive material or is covered with conductive material, the positive electrode piece also plays a role of current collecting.

One or more electric-conductive layers within positive electrode grid are provided in the grid units of the positive electrode grid, and several layers of the electric-conductive layer within positive electrode grid are tightly contacted or isolated from each other. The cathode surface current-collecting layer and the electric-conductive layer within positive electrode grid are electron conductive layers having a through-pore structure and a thickness of 1 to 2000 µm, preferably from 0.05 to 1000 µm. The cathode surface current-collecting layer and the electric-conductive layer within positive electrode grid have a pore diameter of 0.01 to 2000 µm, preferably from 10 to 1000 µm, and a through-pore porosity of 10% to 90%. The cathode surface current-collecting layer and/or the electric-conductive layer within positive electrode grid are conductive metal layers. The conductive metal layer is a metal mesh or a metal wire woven mesh, and the mesh pore is square, rhombus, rectangle, polygon and so on. Or, the conductive metal layer is a foamed metal mesh with a through-pore structure. Or, the conductive metal layer is a porous metal plate or a porous metal foil, and the material of the conductive metal layer is stainless steel, aluminum, silver and so on. Or, the cathode surface current-collecting layer and/or the positive electrode grid conducive layer is a carbon fiber conductive fabric, or conductive blanket composed of metal wires and organic fibers. The material of metal wire is aluminum, aluminum alloy, stainless steel, silver, and so on. The organic fiber is selected from the group consisting of natural cotton and linen, dacron, aramid, nylon, polypropylene fiber, polyethylene and polytetrafluoroethylene, or a mixture thereof. Or, the cathode surface current-collecting layer and/or the electric-conductive layer within positive electrode grid is a metal conductive layer, a conductive blanket, inorganic nonmetal material and porous organic material, each of the above which is coated with an electric-conductive coating layer or plated with a metal thin film. The conductive coating layer is a mixture of the conductive agent and the binder, or the conductive coating layer is a mixture of the conductive agent, the cathode active material and the binder. The mixing manner is bonding, spraying, evaporation deposition or mechanical pressing. The porous organic material includes natural cotton and linen, dacron, aramid, nylon, polypropylene fiber, polyethylene and polytetrafluoroethylene. The inorganic nonmetal material includes glass fiber nonwoven fabric and ceramic fiber paper. The conductive agent is selected from the group consisting of carbon black, Ketjenblack, graphene, carbon nanotube, carbon fiber, amorphous carbon, metal conductive particle and metal conductive fiber, or a mixture thereof. The material of the metal conductive particle or metal conductive fiber is aluminum, stainless steel, silver and so on. The binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof. Or, the cathode surface current-collecting layer and/or the electric-conductive layer within positive electrode grid is a combination of the two or more of the above. Adding electric-conductive layer within positive electrode grid to the grid unit of the positive electrode grid on one hand performs a better supporting effect on the electric-conductive cathode particles in the grid units, on the other hand decreases the internal resistance of the battery by collecting current with the cathode surface current-collecting layer together.

The cathode surface current-collecting layer further comprises an interface-improving layer, and the interface-improving layer is combined on the surface of the cathode surface current-collecting layer by one or more methods of vacuum evaporation deposition, magnetron sputtering, plasma deposition, spraying, bonding, mechanical pressing, printing or inkjet printing. The material of the interface-improving layer comprises the conductive agent and the binder, and the mass ratio of the binder to the conductive agent is 0.5 to 20:99.5 to 80. Or the interface-improving layer only comprises the conductive agent. The conductive agent is selected from the group consisting of carbon black, Ketjenblack, graphene, carbon nanotube, carbon fiber, amorphous carbon, metal conductive particle and metal conductive fiber, or a mixture thereof. The material of the metal conductive particle or the metal conductive fiber is aluminum, stainless steel, silver and so on. The binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof. The interface-improving layer is tightly coated on the grid of the cathode surface current-collecting layer, capable of improving the interface properties of the cathode surface current-collecting layer and decreasing interface resistance between itself and the electric-conductive cathode layer.

The electric-conductive cathode layer comprises a first electric-conductive cathode layer and a second electric-conductive cathode layer, and the second electric-conductive cathode layer is provided between the two first electric-conductive cathode layers. The thickness of the electric-conductive cathode layer is preferably from 0.5 to 10 mm, and the thickness of the first electric-conductive cathode layer is preferably not less than 0.05 mm and not more than 10 mm. The electric-conductive cathode particles of the first electric-conductive cathode layer are partly or all provided on the surface or in the mesh pores of the cathode surface current-collecting layer; the second electric-conductive cathode layer and the first electric-conductive cathode layer are tightly contacted, and the second electric-conductive cathode layer comprises electric-conductive cathode particles without adhesive bonding. When the electric-conductive cathode layer comprises the first electric-conductive cathode layer and the second electrode active conductive layer, the electric-conductive cathode particles in the second electric-conductive cathode layer may not contain cathode active material and only contains the conductive agent. Since the first electric-conductive cathode layer has a better conductive contact with the cathode surface current-collecting layer, it can better provide energy for the battery at a high rate.

The positive electrode piece further comprises a leakage-preventing separating layer, and the leakage-preventing separating layers are provided on the outermost side of the positive electrode piece. The leakage-preventing separating layer has a pore diameter of 10 to 800 μm, and a thickness of 0.01 to 1000 μm, and the through-pore has a porosity of 10% to 90%. The leakage-preventing separating layer has either a single-layer or multi-layer structure. The material, thickness, pore diameter and porosity of the through-pore of each layer in the multiple-layer structure are either the same or different. The leakage-preventing separating layer not only plays a role of isolating electrons, but also plays a role of preventing the electric-conductive cathode particles from leaking from the positive electrode piece. By pasting the leakage-preventing separating layer on the outermost side, the insulation sealing of the positive electrode piece is realized. The material of the leakage-preventing separating layer is electron nonconductive porous polymer material. Or, the material of the leakage-preventing separating layer is an electric-insulating porous material composed of inorganic nonmetal material and organic polymer. Or, the material of the separating layer is an electric-insulating gel polymer electrolyte composite material composed of three parts: a polymer matrix, a liquid organic plasticizer and a lithium salt. Or, the material of the separating layer is the material which infuses ion conductive electrolyte or polymer gel material in the pores of the electron electric-insulating polymer material or in the pores of the porous material composed of the inorganic nonmetal material and organic polymer.

The positive electrode piece further comprises positive electrode tab. The positive electrode tab can be electrically connected to the positive electrode grid and/or the cathode surface current-collecting layer. Several components jointly collect the current so that the currents in the positive electrode piece distribute more uniformly, and avoid the heating phenomenon caused by high rate charging-discharging of the battery.

The negative electrode piece in the no-liquid cell-core of the lithium slurry battery will be described in details hereinafter.

In the negative electrode piece, the electric-conductive lithium-intercalatable anode layer is lithium-containing metal body, electric-conductive lithium-intercalatable anode particle in accumulated state, or a combination thereof.

The negative electrode piece comprises a first anode current-collecting layer, and the first anode current-collecting layer completely covers the surface of the electric-conductive lithium-intercalatable anode layer and conductively contacts with the electric-conductive lithium-intercalatable anode layer tightly. The first anode current-collecting layer is an electron conductive layer that has a through-pore structure and a thickness of 1 to 2000 μm. The first anode current-collecting layer has a pore diameter of 10 to 800 μm, and the through-pore has a porosity of 10% to 90%. The first anode current-collecting layer is on the two sides of the electric-conductive lithium-intercalatable anode layer. Under the condition that the electric-conductive lithium-intercalatable anode layer contains the electric-conductive lithium-intercalatable anode particles in accumulated state, the first anode current-collecting layer also plays a role of sealing, which prevents the lithium-intercalatable anode material in the electric-conductive lithium-intercalatable anode layer from dropping off and influencing the performance of the battery, and in addition it also better ensures the flatness of the surface of the pole piece.

The negative electrode piece further comprises a leakage-preventing separating layer, and the leakage-preventing separating layers are provided on the outermost side of the negative electrode piece. The leakage-preventing separating layer has a pore diameter of 10 to 800 μm, and a thickness of 0.01 to 1000 μm, and the through-pore has a porosity of 10% to 90%. The leakage-preventing separating layer has either a single-layer or multi-layer structure. The material, thickness, pore diameter and porosity of the through-pore of each layer in the multiple-layer structure are either the same or different. The leakage-preventing separating layer not only plays a role of isolating electrons, but also plays a role of preventing the electric-conductive lithium-intercalatable anode particles from leaking from the negative electrode piece. By pasting the leakage-preventing separating layer on the outermost side, the insulation sealing of the negative electrode piece is realized. The material of the leakage-preventing separating layer is electron nonconductive porous polymer material. Or, the material of the leakage-preventing separating layer is an electric-insulating porous material composed of inorganic nonmetal material and organic polymer. Or, the material of the separating layer is an electric-insulating gel polymer electrolyte composite material composed of three parts which comprise of a polymer matrix, a liquid organic plasticizer and a lithium salt. Or, the material of the separating layer is the material which infuses ion conductive electrolyte or polymer gel material in the pores of the electron electric-insulating polymer material or in the pores of the porous material composed of the inorganic nonmetal material and organic polymer.

There is a lithium-intercalatable layer provided on the surface and/or in the pores of the first anode current-collecting layer. The lithium-intercalatable layer is a lithium-intercalatable porous layer and/or a lithium-intercalatable foil layer. The lithium-intercalatable porous layer and/or lithium-intercalatable foil layer has either a single-layer structure or a multi-layer structure. The material, thickness, and porosity or pore diameter of the through-pore of each layer in the multi-layer structure are either the same or different.

The lithium-intercalatable porous layer has a thickness of 0.01 to 2000 μm, and the through-pore has a porosity of 30% to 98%, and the pore diameter is from 10 nm to 2 mm. Therein, at least one layer of the lithium-intercalatable porous layers is a porous lithium-intercalatable conductive metal layer. The porous lithium-intercalatable conductive metal layer is a metal mesh or a metal wire woven mesh, and the shape of the mesh pore is square, rhombus, rectangle, polygon and so on. Or, the porous lithium-intercalatable conductive metal layer is a porous foamed metal layer with porous structure. Or, the porous lithium-intercalatable conductive metal layer is a porous metal plate or a porous metal foil. The material of the porous lithium-intercalatable conductive metal layer is a lithium-intercalatable metal such as aluminum, aluminum lithium alloy, tin-based alloy, lithium silicon alloy and lithium titanium alloy. Therein, at least one layer of the lithium-intercalatable porous layers is a porous conductive layer covered with lithium-intercalatable material. The porous conductive layer can be a conductive metal layer. The conductive metal layer is a metal mesh or a metal wire woven mesh, and the shape of the mesh pore is square, rhombus, rectangle, polygon and so on. Or, the conductive metal layer is a porous foamed metal layer with a porous structure. Or, the conductive metal layer is a porous metal plate or a porous metal foil, and the material of the conductive metal layer is stainless steel, nickel, titanium, tin, tin-plated copper, nickel-plated copper and so on. Or the porous conductive layer is the carbon fiber conductive fabric, or the electric-conductive felt composed of metal wires and organic fibers. Or the porous conductive layer is a porous organic material coated with the conductive coating layer or plated with a metal thin film. The porous organic material includes natural cotton and linen, dacron, aramid, nylon, polypropylene fiber, polyethylene polytetrafluoroethylene and so on. The lithium-intercalatable material is selected from the group consisting of aluminum-based alloy, silicon-based alloy, tin-based alloy, lithium titanium oxide, lithium silicon oxide, metal lithium powder and graphite, or a mixture thereof, in which lithium can be embedded. Therein, at least one layer of the lithium-intercalatable porous layers is a porous mixture of the lithium-intercalatable material, conductive agent and binder, or a porous mixture of the lithium-intercalatable material, conductive agent and polymer electrolyte layer. The mass percentage of the conductive agent is not less than 70%, and the mass percentage of the lithium-intercalatable material is not less than 10%. The material of the lithium-intercalatable material is selected from the group consisting of aluminum-based alloy, silicon-based alloy, tin-based alloy, lithium titanium oxide, lithium silicon oxide, metal lithium powder and graphite, or a mixture thereof, in which lithium can be embedded. The conductive agent is selected from the group consisting of carbon black, carbon nanotube, carbon fiber, graphene, titanium powder, aluminum powder, silver powder, aluminum alloy powder, stainless steel powder or silver powder, lithium-rich silicon powder, metal alloy conductive particle such as lithium-containing alloy powder, and lithium-containing carbon material, or a mixture thereof. The binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof. The polymer electrolyte layer is a gel polymer electrolyte composite material composed of three parts, which are polymer matrix, liquid organic plasticizer and lithium salt. Or, at least one layer of the lithium-intercalatable porous layer is a combination of any two or more of the above. The lithium-intercalatable porous layer will embed lithium while charging, and avoids lithium deposit on the surface of the positive electrode piece and forms lithium dendrites, and greatly improves the safety of the battery.

The material of the lithium-intercalatable foil layer is a material which can perform a reversible lithium deintercalation reaction and an in situ pulverization during the lithium intercalation-deintercalation reaction. The material of the lithium-intercalatable foil layer comprises aluminum and aluminum-based alloy, tin and tin-based alloy, zinc and zinc-based alloy and silicon, silicon-based alloy and so on. The materials comprise elements such as Mg, Ca, Si, Ge, Sn, Pb, As, Sb, Bi, Pt, Ag, Au, Zn, Cd, Hg and so on, which are capable of carrying out solid solution and/or addition reaction with lithium. The lithium-intercalatable foil layer has a thickness of 0.01 to 1000 µm, and preferably from 5 to 200 µm. Each lithium-intercalatable foil layer has a single-layer structure or a multi-layer structure. Under condition that the lithium-intercalatable foil layer has a multi-layer structure, the material of each layer is either the same or not. The layers of the multi-layer structure are either merely superposed together or connected together by methods of welding, spraying, bonding, electrochemical plating, electroless plating, vacuum vapor deposition, mechanical pressing and so on.

The negative electrode piece further comprises one or more second anode current-collecting layers, and the second anode current-collecting layers can be disposed at one or more positions below: in the electric-conductive lithium-intercalatable anode layers, between two layers of the lithium-intercalatable multiple-layer structure, and between the lithium-intercalatable layer and the separating layer. Therein, the first anode current-collecting layer and/or the second anode current-collecting layer are the conductive metal layers. The conductive metal layer is a metal mesh or a metal wire woven mesh, and the mesh pore is square, rhombus, rectangle, polygon and so on. Or, the conductive metal layer is a porous foamed metal layer with a porous structure. Or, the conductive metal layer is a porous metal plate or a porous metal foil, and the material of the conductive metal layer is stainless steel, nickel, titanium, tin, tin-plated copper, nickel-plated copper and so on. Or, the first anode current-collecting layer and/or the second anode current-collecting layer are the carbon fiber conductive fabric, or the electric-conductive felt composed of metal wires and organic fibers. The material of the metal wire is stainless steel, nickel, titanium, tin, tin-plated copper, nickel-plated copper and so on. The organic fiber is selected from the group consisting of natural cotton and linen, dacron, aramid, nylon, polypropylene fiber, polyethylene and polytetrafluoroethylene, or a mixture thereof. Or, the first anode current-collecting layer and/or the second anode current-collecting layer is a metal conductive layer, conductive blanket, inorganic nonmetal material and porous organic material, each of which is coated with the conductive coating layer or plated with the metal thin film on the surface. The conductive coating layer is a composite of the conductive agent and binder, or a composite of the conductive agent, lithium-intercalatable anode material and binder. The combining manner is bonding, spraying, evaporation deposition, mechanical pressing and so on. The porous organic material includes natural cotton and linen, dacron, aramid, nylon, polypropylene fiber, polyethylene, polytetrafluoroethylene, and so on. The inorganic nonmetal material includes glass fiber nonwoven fabric, ceramic fiber paper, and so on. The material of the conductive thin film is stainless steel, nickel, titanium, tin, tin-plated copper, nickel-plated copper and so on. The conductive agent is selected from the group consisting of carbon black, Ketjenblack, graphene, carbon nanotube, carbon fiber, amorphous carbon, metal conductive particle and metal conductive fiber, or a mixture thereof. The material of the metal conductive particle or the metal conductive fiber is aluminum, stainless steel, silver and so on. The binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof. The first anode current-collecting layer and/or the second anode current-collecting layer is a combination of any two or more of the above. Several negative current collecting layers jointly collect the current so that the currents in the negative electrode piece distribute more uniformly, and avoid the heating phenomenon caused by high rate charging-discharging of the battery.

The negative electrode piece further comprises a negative electrode tab, and the negative electrode tab can be electrically connected to one or more of the following components: electric-conductive lithium-intercalatable anode layer, the first anode current-collecting layer and the second anode current-collecting layer.

The present disclosure also provides a lithium slurry battery module, wherein the lithium slurry battery module comprises of a cell can and one or more series-parallel-connected battery cells in the cell can, and the cell can comprises a top lid of the cell can and a lower case of the cell can. The battery cell comprises: a shell of battery cell, which comprises a top lid of the shell and a lower case of the shell, and the top lid of the shell connects with the lower case of the shell to form a battery cell inner chamber; the above no-liquid cell-core, and the no-liquid cell-core is disposed in the shell of battery cell; a positive terminal, and the positive terminal extends out from the shell of battery cell and is fluid sealed with the shell of battery cell, and the positive electrode piece of the no-liquid cell-core is conductively connected with the positive terminal through a positive electric-conductive connector; a negative terminal, and the negative terminal extends out from the shell of battery cell and is fluid sealed with the shell of battery cell, and the negative electrode piece of the no-liquid cell-core is conductively connected with the negative terminal through a negative electrode conductive connector; a first port and a second port, and the first port and the second port are provided on the shell of battery cell, being used for fluid communicating the inside and outside of the shell. When electrolyte is not injected to the battery cell, there is no electrolyte in the no-liquid cell-core, that is, the positive electrode piece and the negative electrode piece are in dry state and the separating space is an empty chamber. After injecting electrolyte to the shell of battery cell through the port, the no-liquid cell-core is disposed in the electrolyte, and electrode slurry is formed in the positive electrode piece and negative electrode piece and the electrolyte fills up the separating space. The first port may be an injection interface and the second port may be a discharge interface. The electrolyte, gas or washing liquid can be injected to the shell of battery cell through the injection interface, and the electrolyte, gas or washing liquid can be discharged from the shell of battery cell through the discharge interface. Under such condition, the injection interface is connected to the interface of gas or liquid injecting device, and the discharge interface is connected to the interface of the suction apparatus or collection device. In addition, the first port is an injection-discharge interface and the second port is a gas pressure regulating vent, and the electrolyte, gas or washing liquid can be injected to the shell of battery cell through the injection-discharge interface, and meanwhile the gas in the shell of battery cell can be discharged through the gas pressure regulating vent. Or the electrolyte, gas or washing liquid in the shell of battery cell can be discharged through the injection-discharge interface, and meanwhile the gas can be injected to the shell of battery cell through the gas pressure regulating vent. Under such condition, the injection-discharge interface can be connected to the interface of the gas or liquid injection device, and can be connected to the interface of the suction apparatus or collection device. The gas pressure regulating vent mainly plays a role of regulating the gas pressure in the shell of battery cell, so that is contributed to injecting or discharging the fluid through the injection-discharge interface. For example, discharging gas from the gas pressure regulating vent facilitates injecting and filling up the shell of battery cell with electrolyte through the injection-discharge interface; injecting gas through the gas pressure regulating vent facilitates the discharge and evacuation of the electrolyte in the shell of battery cell from the injection-discharge port.

The battery cell further comprises a division plate in cell inner chamber. The division plate in cell inner chamber is disposed on the division plate connecting part of the lower case of the shell and divides the battery cell inner chamber into a first inner chamber of the battery cell and a second inner chamber of the battery cell. There is no-liquid cell-core disposed in the second inner chamber of the battery cell. The injection interface and the discharge interface is in fluid communication with the second inner chamber of the battery cell. Preferably, the first inner chamber of the battery cell is sealed from the second inner chamber of the battery cell. Therein, there may be disposed dry gas in the first inner chamber of the battery cell or the second inner chamber of the battery cell. The dry gas is selected from the group consisting of nitrogen, air, flam-resistant gas (for example sulfur hexafluoride), and inert gas (helium, neon, argon, krypton, xenon), or a mixture thereof. Preferably, the water content of the dry gas is ≤1 ppm. A gas pressure regulating valve is provided on the top lid of the shell. The gas pressure in the first inner chamber of the battery cell is regulated by the gas pressure regulating valve so that the gas pressure in the first inner chamber of the battery cell is larger than or equal to the gas pressure in the second inner chamber of the battery cell, and the gas pressure in the first inner chamber of the battery cell is more than one atmosphere pressure. That is to say, gas can be filled in the first inner chamber of the battery cell through the gas pressure regulating valve. Due to the gas pressure difference between the first inner chamber of the battery cell and the second inner chamber of the battery cell, the sealing between the division plate in cell inner chamber and the lower case of the battery cell shell is enhanced, so as to enhance the sealing between the top lid of the battery cell shell and the lower case of the battery cell shell. The division plate connecting part provided on the lower case of the shell can be any of the methods that can be connected and fixed to the division plate in cell inner chamber, for example, protruded portion, recessed portion, step portion and so on. The battery cell of the lithium slurry battery of the present disclosure may not be sealed by the conventional welding method, but is connected and sealed with detachable connecting parts. Thus, in order to ensure that the sealing performance of the battery cell of the whole lithium slurry battery meets the requirement, the gas pressure difference between the first inner chamber of the battery cell and the second inner chamber of the battery cell is further used to enhance the sealing on the base of the sealing of the detachable connecting parts. The second inner chamber of the battery cell may be evacuated or left with a small amount of dry gas. The gas pressure in the first inner chamber of the battery cell is larger than or equal to the gas pressure in the second inner chamber of the battery cell, so as to effectively take use of the gas pressure difference to achieve the sealing. Preferably, the gas pressure in the first inner chamber of the battery cell is larger than one atmosphere pressure.

The battery cell further comprises an electric-insulating sealing bag, and the no-liquid cell-core is disposed in the electric-insulating sealing bag and sealed, and the electric-insulating sealing bag-sealed no-liquid cell-core is disposed in the shell of battery cell. The cell is doubly sealed with the electric-insulating sealing bag and the shell of battery cell. The positive electric-conductive connector and the negative electrode conductive connector extend out from the electric-insulating sealing bag, and the electric-insulating sealing bag is connected with the injection interface by an input pipe and is connected with the discharge interface by an output pipe. The electrolyte may be injected to the electric-insulating sealing bag through the injection interface and the input pipe, so that the no-liquid cell-core is disposed in the electrolyte and is fully immersed by the electrolyte. Moreover, the electrolyte in the electric-insulating sealing bag may be discharged through the discharge interface and discharge pipe. The material of the electric-insulating sealing bag may be aluminum plastic composite film and so on.

The injection interface can quickly connect with or disconnect from interface of the liquid-injecting/gas-injecting device so as to inject liquid or gas to the battery cell, and the discharge interface can quickly connect with or disconnect from interface of the suction apparatus and collection device so as to discharge the liquid or gas from the battery cell. When the injection interface or the discharge interface is connected to the interface of the suction apparatus, collection device or liquid-injecting/gas-injecting device, the injection interface or the discharge interface can be manually or automatically opened and gas or liquid can be allowed to pass. When the injection interface of the discharge interface is disconnected from the interface of the suction apparatus, collection device or liquid-injecting/gas-injecting device, the injection interface or the discharge interface can be manually or automatically closed. There may disposed a flow valve on the injection interface and the discharge interface, being used for controlling the flow rate of the gas or liquid that is injected from the injection interface or is discharged from the discharge interface. The suction apparatus can be any one of the suction apparatus, for example a pump, as long as the gas or the liquid in the battery cell can be drawn out. The collection device can be any of the gas-collecting devices or liquid-collecting devices. The liquid-injecting device can be any of the liquid-injecting devices such as vacuum liquid-injecting machine, injector and so on, as long as the electrolyte or washing liquid can be injected to the battery cell. The injection interface and the discharge interface can be any of the quick connection interfaces such as snap interface, close nipple and so on. The injection interface and the discharge interface can be quickly and tightly joint with the interface of the suction apparatus, collection device or liquid-injecting/gas-injection device, and can be quickly disconnected after the injection and discharge operation, and realize the separation of the inside and outside of the battery cell by closing the injection and discharge interface.

The injection interface and the discharge interface on the shell of battery cell may be provided on the top or the side wall of the shell of battery cell. Preferably, the injection interface is provided on the top of the shell of battery cell or on the top end of the side wall of the shell of battery cell, which facilitates the inflow of liquid and facilitates the filling of the entire battery cell shell of the lithium slurry battery with the liquid. Preferably, the discharge interface is disposed at the bottom of the side wall of the shell of battery cell, which facilitates complete outflow of the liquid. When the discharge interface has a certain distance from the bottom of the shell of battery cell, a discharge passage should be disposed. One end of the discharge passage is connected to the discharge interface, and the other end of the discharge passage extends to the bottom of the shell of battery cell, so that all the liquid at the bottom of the shell of battery cell can be discharged. Therein, the discharge passage may be a rigid pipe, a flexible pipe or formed integrally with the shell of battery cell. A sealing cover of the interface may be provided on the battery cell, and the injection interface and the discharge interface are respectively sealed with the sealing cover of the interface.

In order to facilitate the overall simultaneous liquid exchange of the battery cells in the entire lithium slurry battery module, the lithium slurry battery module may also comprise an integral liquid-exchanging system. However, each battery cell in the lithium slurry battery module can be subjected to liquid exchanging separately or in turns through the integral liquid-exchanging system. The integral liquid-exchanging system comprises a main injection pipe, a branch injection pipe, a main discharge pipe and a branch discharge pipe. The main injection pipe is in fluid communication with the branch injection pipe and the branch injection pipe is connected to the injection interface of the battery cell. The main discharge pipe is in fluid communication with the branch discharge pipe and the branch discharge pipe is connected to the discharge interface of the battery cell. In addition, a main injection port and a main discharge port may be provided on the top lid of the cell can of the lithium slurry battery module. The main injection port is in fluid communication with the main injection pipe and the main discharge port is in fluid communication with the main discharge pipe. There may disposed a detachable sealing element on the main injection port and the main discharge port, which is used for opening or closing the main injection port and the main discharge port, for example sealing plug, bolt and so on. Or, a valve of the main injection port and a valve of the main discharge port may be provided on the main injection port and the main discharge port. With the valve of the main injection port and the valve of the main discharge port, the main injection port and the main discharge port can be opened or closed, and the total gas volume and total liquid volume injected to and discharged from the lithium slurry battery module can be controlled. With the integral liquid-exchanging system, each battery cell disposed in the inner chamber of the cell can may be directly subjected to liquid exchanging without opening the cell can of the lithium slurry battery. The overall suction from the main discharge port by the suction device enable the liquid or gas in the battery cell to be discharged through the discharge interface of the battery cell, the branch discharge pipe, the main discharge pipe and the total discharge port. The overall injection of the main injection port by using the liquid injection device enables the electrolyte or the washing liquid to be injected into the battery cell through the main injection port, the main injection pipe, the branch injection pipe, and the injection interface of the battery cell. The valve of the main injection port and the valve of the main discharge port can control the total gas volume and the total liquid volume injected to or discharged from the lithium slurry battery module. The gas volume and the liquid volume injected to or discharged from each battery cell can be controlled by the flow valve that is provided on the injection interface and the discharge interface of the shell of battery cell, so as to realize the control of the liquid-injecting volume of the entire lithium slurry battery module and each battery cell. The main injection pipe and the main discharge pipe may be filled with dry gas. Preferably, the gas pressure is larger than one atmosphere pressure, so as to improve the sealing property of the injection interface and discharge interface of the lithium slurry battery.

The material of the main injection pipe, branch injection pipe, main discharge pipe and branch discharge pipe is metal material or electrolyte-resistant insulation material. The metal material may be stainless steel, aluminum, and so on. The electrolyte-resistant insulation material may be polytetrafluoroethylene, polypropylene, polyethylene and so on. The main injection pipe, the branch injection pipe, the main discharge pipe and the branch discharge pipe may be the rigid pipes or soft pipes; or the main injection pipe, the branch injection pipe, the main discharge pipe and the branch discharge pipe may be integrally formed with the top lid of the cell can.

After injecting electrolyte to the shell of battery cell through the injection interface, the battery cell inner chamber is between the top lid of the shell and the liquid level of the electrolyte in the shell of battery cell. There is dry gas disposed in the inner chamber of the cell can and/or the battery cell inner chamber. The gas pressure in the inner chamber of the cell can is larger than or equal to the gas pressure in the battery cell inner chamber, so that a gas pressure difference is formed between the inner chamber of the cell can and the inner chamber of the battery cell. The gas pressure difference contributes to enhance the sealing between the top lid of the shell and the lower case of the shell. The cell of the lithium slurry battery of the present disclosure may not be sealed by the conventional welding method, but is connected and sealed with a detachable connecting part. Thus, in order to ensure that the sealing property of the cell of the entire lithium slurry battery meets the requirement, on the base of the sealing with the detachable connecting part, the gas pressure difference between the inner chambers of the cell can and the inner chamber of the shell is further used to enhance the sealing. The battery cell shell can be evacuated or left with a small amount of dry gas. The gas pressure in the inner chamber of the cell can of the lithium slurry battery module needs to be greater than or equal to the gas pressure in the shell of battery cell, thereby effectively utilizing the pressure difference to achieve the seal. Preferably, the gas pressure in the inner chamber of the cell can is larger than one atmosphere pressure. The dry gas is selected from the group consisting of nitrogen, air, flame-resisting gas (for example sulfur hexafluoride) and inert gas (helium, neon, argon, krypton, xenon), or a mixture thereof. Preferably, the dry gas has a water content of ≤0.1 ppm.

There is an exhaust port of the battery cell shell provided on the top lid of the battery cell shell, and an exhaust valve is provided on the exhaust port of the battery cell shell. During the use of the lithium slurry battery, due to reasons such as over-charge and over-discharge, electrolyte volatilization and so on, the gas pressure in the inner chamber of the battery cell will rise. When the gas pressure in the inner chamber of the battery cell is higher than the gas pressure in the inner chamber of the cell can, the gas in the inner chamber of the battery cell is discharged to the inner chamber of the cell can through the exhaust valve. The gas in the inner chamber of the battery cell can be discharged directly into the atmosphere or a gas-collecting device in addition to being discharged into the inner chamber of the cell can. Under the condition that the gas in the inner chamber of the lithium slurry battery is directly discharged to the atmosphere or a gas-collecting device, there is an exhaust port of the battery cell shell provided on the top lid of the battery cell shell, and there is an exhaust valve provided on the exhaust port of the shell of battery cell. There is an exhaust port of the cell can provided on the cell can of the lithium slurry battery module, and there is an exhaust valve provided on the exhaust port of the cell can. The exhaust port of the battery cell shell is connected with the exhaust port of the cell can through the branch exhaust pipe and the main exhaust pipe. When the gas pressure in the battery cell inner chamber is higher than the predetermined value, the gas in the battery cell inner chamber enters the branch exhaust pipe through the exhaust valve of the exhaust port of the battery cell shell. When the gas pressure in the main exhaust pipe is higher than the predetermined value, the gas in the main exhaust pipe is discharged to the atmosphere or a gas-collecting device through the exhaust valve of the exhaust port of the cell can. By discharging the gas in the cell of the lithium slurry battery in time, it is possible to effectively prevent an unsafe situation such as explosion of the lithium slurry battery cell due to excessive internal pressure. At the same time, because of the secondary sealing of the cell can of the lithium slurry battery module, a reusable exhaust valve can be used as a passage for gas discharge. The above exhaust valve may be a pressure control valve. In the event that the gas pressure is greater than the preset pressure of the pressure control valve, the pressure control valve will automatically vent until the gas pressure value returns to within the predetermined pressure range and the pressure control valve closes.

In addition, the exhaust port of the cell can is provided on the top lid of the cell can of the lithium slurry battery module, and a gas pressure regulating valve is provided on the exhaust port of the cell can. When the gas pressure in the inner chamber of the cell can is higher than the maximum predetermined value, the gas in the inner chamber of the cell can is discharged to the atmosphere or the gas-collecting device through the gas pressure regulating valve. When the gas pressure in the inner chamber of the cell can is less than the minimum predetermined value, the gas is injected to the inner chamber of the cell can through the gas pressure regulating valve. The gas pressure regulating valve can be a two-way pressure control valve. Herein, the maximum predetermined value and the minimum predetermined value of the gas pressure in the inner chamber of the cell can may be determined according to actual conditions. The maximum predetermined value of the air pressure is to ensure the safety performance of the lithium slurry battery module cell can. The minimum predetermined value of the air pressure is to ensure a constant pressure difference between the inner chambers of the cell can of the lithium slurry battery module and the inner chamber of the battery cell of the lithium slurry battery module.

In order to realize the connection and sealing between the top lid of the battery cell shell and the lower case of the battery cell shell of the lithium slurry battery cell, a top lid detachable connecting part is provided on the top lid of the battery cell shell, and a lower case detachable connecting part is provided on the lower case of the shell, and under the action of the gas pressure difference between the inner chamber of the cell can and the inner chamber of the battery cell shell, the top lid detachable connecting part and the lower case detachable connecting part can be tightly connected. Therein, the top lid detachable connecting part of the top lid of the shell and the lower case detachable connecting part of the lower case of the shell are connected by snapping, bolting, bonding, and so on. The lithium slurry battery cell can be quickly disassembled without being damaged through the above-mentioned detachable connection portion, so that the maintenance and recovery of the lithium slurry battery can be facilitated. In addition, in order to enhance the sealing performance, at least one sealing ring is provided between the top lid detachable connecting part of the top lid of the shell and the lower case detachable connecting part of the lower case of the shell.

There is only dry gas accommodated in the inner chamber of the cell can of the lithium slurry battery module, or there is dry gas and liquid such as electrolyte, electrolyte solvent or flame resisting liquid, accommodated in the inner chamber of the cell can. In the case where gas and liquid are simultaneously accommodated in the inner chamber of the cell can, the liquid level of the liquid is higher than the top lid detachable connecting part of the top lid of the battery cell shell of the lithium slurry battery cell. In this way, a liquid seal can be formed by the liquid to the connecting part between the top lid detachable connecting part of the top lid of the battery cell shell and the lower case detachable connecting part of the lower case of the battery cell shell, thereby further enhancing the sealing effect.

In order to realize the connection and sealing between the top lid of the cell can and the lower case of the cell can of the lithium slurry battery module, there is a top lid detachable connecting part provided on the top lid of the cell can and there is a lower case detachable connecting part provided on the lower case of the cell can. The top lid detachable connecting part of the top lid of the cell can and the lower case detachable connecting part of the lower case of the cell can may be connected together by snapping, bolting, bonding and so on. Through the above detachable connecting part, the lithium slurry battery module can be quickly disassembled without being damaged, so that the maintenance and recovery of the lithium slurry battery can be facilitated. In addition, in order to enhance the sealing performance, at least one sealing ring may be provided between the top lid detachable connecting part of the top lid of the cell can and the lower case detachable connecting part of the lower case of the cell can.

Both the top lid of the shell and the lower case of the shell are nested structure, and the inside of the nested structure may be electrolyte-resistant insulation material and the outside of the nested structure may be metal material. Or, the material of the top lid of the shell and the lower case of the shell is metal material or electrolyte-resistant insulation material. The metal material is stainless steel, aluminum, and so on, and the electrolyte-resistant insulation material is polytetrafluoroethylene, polypropylene, polyethylene and so on. The material of the top lid of the cell can and the lower case of the cell can is polytetrafluoroethylene, polypropylene, polyethylene, ABS plastic, stainless steel or aluminum alloy, and so on.

The advantages of the present disclosure will be illustrated hereinafter.

1) During the use of the battery, after injecting the electrolyte, the conductive slurry forms a flexible conductive network between the current collecting layers. When the battery is subjected to shock and impact, whether or not the electrode active material layer bonded to the current collector is detached or loosened, the electrode active material particles are always in conductive contact with the conductive slurry without losing conductive contact as a conventional battery, reducing battery capacity and life.

2) During the use of the battery, the electrolyte swaying in the separating space breaks the bridge formed by the conductive particles, avoids short circuit inside the battery, and improves the safety of use of the power battery.

3) The lithium-intercalatable layer in the negative electrode piece of the lithium slurry battery can insert lithium during charging, which greatly reduces the possibility of internal short circuit of the battery caused by lithium deposition on the surface of the lithium-containing metal body during charging and discharging of the battery. The lithium-containing metal body in the negative electrode piece of the lithium slurry battery can effectively supplement the consumption of lithium caused by the formation of the negative SEI film and the side reaction during the battery cycle, thereby improving the energy density and efficiency of the battery. The common current collection action of the lithium-containing metal body, the lithium-intercalatable layer and the current collecting layer makes the current distribution inside the negative electrode piece more uniform, and avoids the heating phenomenon caused by the high-rate charge and discharge of the battery.

4) The accumulated state electric-conductive cathode particles in the electric-conductive cathode layer and/or the electric-conductive lithium-intercalatable anode particles in the electric-conductive lithium-intercalatable anode layer are in a slurry state after the electrolyte is injected. The accumulated state active conductive layer of the positive electrode and the lithium-intercalatable conductive layer of the negative electrode are more convenient for the matching assembly of the pole piece and the control of the consistency of the pole pieces, thereby avoiding the requirements of the special equipment and environment for slurry filling. After the pole pieces are assembled into the battery module, due to before injecting the electrolyte, the inside of the pole piece is accumulated state electric-conductive cathode layer and the electric-conductive lithium-intercalatable anode layer, and the battery is activated by injecting liquid while being used, thus, it facilitates the storage and transportation of the battery modules, and has application prospects in large-scale energy storage power stations and military civilian reserve power sources.

5) The positive electrode grid has a frame single-grid or multi-grid structure. With the single or multiple grid units being used for storing the electric-conductive cathode particles, the slurry precipitation problem of thick pole piece with large area is effectively solved, and the pole piece flattening is easy to be realized. Cooperating with the upper and lower surface current collecting layers and corporately collecting the current, the requirements of high current output of pole pieces and battery cells are met. The combination of the above points can realize the large-capacity design of a single pole piece, thereby reducing the cost of the battery, and is more conducive to the application of the lithium slurry battery in the field of electric vehicles and large-scale energy storage.

6) By changing liquid of the lithium slurry battery, it can effectively extend the service life of the battery and improve battery performance.

7) The gas pressure in the inner chamber of the cell can of the lithium slurry battery module is higher than the gas pressure of the inner chamber of the battery cell, so that the top lid of the battery cell shell and the lower case of the battery cell shell of battery cell always maintains a positive pressure press fitting in a certain range, which effectively improves the sealing performance of the battery cell. The top lid of the battery cell and the lower case of the battery cell of the lithium slurry battery cell can be fixed and connected by a detachable method, which provides convenience to the maintenance and recycle of the lithium slurry battery cell. The gas in the inner chamber of the battery cell is discharged to the inner chamber of the cell can of the lithium slurry battery module through the exhaust valve or directly discharged into the gas collection device. This can effectively prevent unsafe conditions such as explosion of the lithium slurry battery cell due to excessive internal pressure.

BRIEF DESCRIPTION OF DRAWINGS

FIG. 7 is a schematic representation of a section of the positive electrode piece for the lithium slurry battery according to the second example of the present disclosure and local details of which.

LIST OF MARKS IN THE FIGS

1—Cell-core
2—Positive electrode piece
201—Electric-conductive cathode layer
202—First electric-conductive cathode layer
203—Second electric-conductive cathode layer
204, 204', 204"—Cathode surface current-collecting layer
205—Leakage-preventing porous layer
206—Multi-grid positive electrode piece
207—Positive electrode grid
208—Grid unit
209—Positive electrode tab
210—Interface-improving layer
3—Negative electrode piece
301—Electric-conductive lithium-intercalatable anode layer
302—Lithium-containing metal body
303—Negative lithium-intercalatable conductive particle layer
304—First anode current-collecting layer
305—Leakage-preventing separating layer
306—Negative electrode tab
307—Lithium-intercalatable foil layer
308—Sandwich composite structure
4—Separating space
5—Separating layer
6—Insulation sealing frame
7—Cell of lithium slurry battery
701—Shell of battery cell
702—Top lid of the shell
703—Lower case of the shell
704—Positive terminal
705—Negative terminal
706—Injection interface
707—Flow valve of the injection interface
708—Discharge interface
709—Flow valve of the discharge interface
710—Discharge passage
711—Exhaust valve
712—Battery cell inner chamber
713—First inner chamber of the battery cell
714—Second inner chamber of the battery cell
715—Cell inner chamber division plate
716—Sealing cover of the interface
717—Gas pressure regulating valve
718—Division plate connecting part
8—Lithium slurry battery module
801—Cell can
802—Top lid of the cell can
803—Lower case of the cell can
804—Inner chamber of the cell can
805—Main injection port
806—Valve of the main injection port
807—Main discharge port
808—Valve of the main discharge port
809—Gas pressure regulating valve
810—Branch exhaust pipe
811—Main exhaust pipe
812—Integral liquid-exchanging system
813—Main injection pipe
814—Branch injection pipe
815—Main discharge pipe
816—Branch discharge pipe 9—Detachable connecting part
901—Top lid detachable connecting part
902—Lower case detachable connecting part
903—Protruded portion of outer ring
904—Protruded portion of inner ring
905—Recessed portion
906—Upper stair portion
907—Lower stair portion
908—Bolt hole
909—Upper lug
910—Lower lug
911—Groove of the sealing ring

DETAILED DESCRIPTION

The present disclosure will be further illustrated by the following examples in conjunction with the accompanying drawings.

Figure 1:
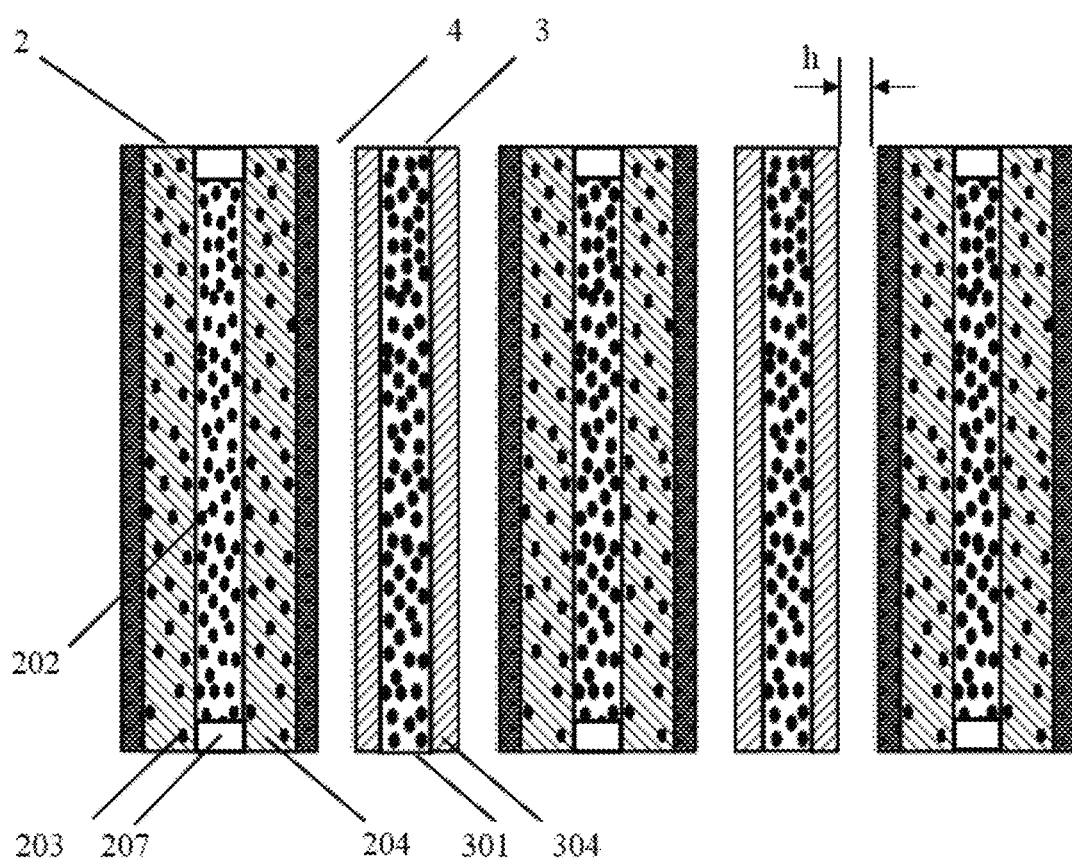
FIG. 1 is a schematic representation of the no-liquid cell for lithium slurry battery according to the first Example of the present disclosure.

FIG. 1 is a schematic representation of the no-liquid cell for lithium slurry battery according to the first Example of the present disclosure. The cell-core of the lithium slurry battery comprises several positive electrode pieces 2 and negative electrode pieces 3 that overlap alternately. There is a separating space 4 with a height (h) of 0.1 to 1 mm provided between the positive electrode piece 2 and the negative electrode piece 3, and the separating space 4 may be filled with electrolyte. The positive electrode piece 2 comprises a positive electrode grid 207 having a through-hole grid unit, a cathode surface current-collecting layer 204, and an electric-conductive cathode layer consisting of a first electric-conductive cathode layer 202 and a second electric-conductive cathode layer 203. The electric-conductive cathode particles of the first electric-conductive cathode layer 202 penetrate into the pores of the cathode surface current-collecting layer 204, and the second electric-conductive cathode layer 203 is located between the two first electric-conductive cathode layers 202. The second electric-conductive cathode layer 203 comprises electric-conductive cathode particles without adhesive bonding. The negative electrode piece 3 comprises a first anode current-collecting layer 304 and an electric-conductive lithium-intercalatable anode layer 301, and the electric-conductive lithium-intercalatable anode layer 301 comprises electric-conductive lithium-intercalatable anode particles without adhesive bonding.

Figure 2:
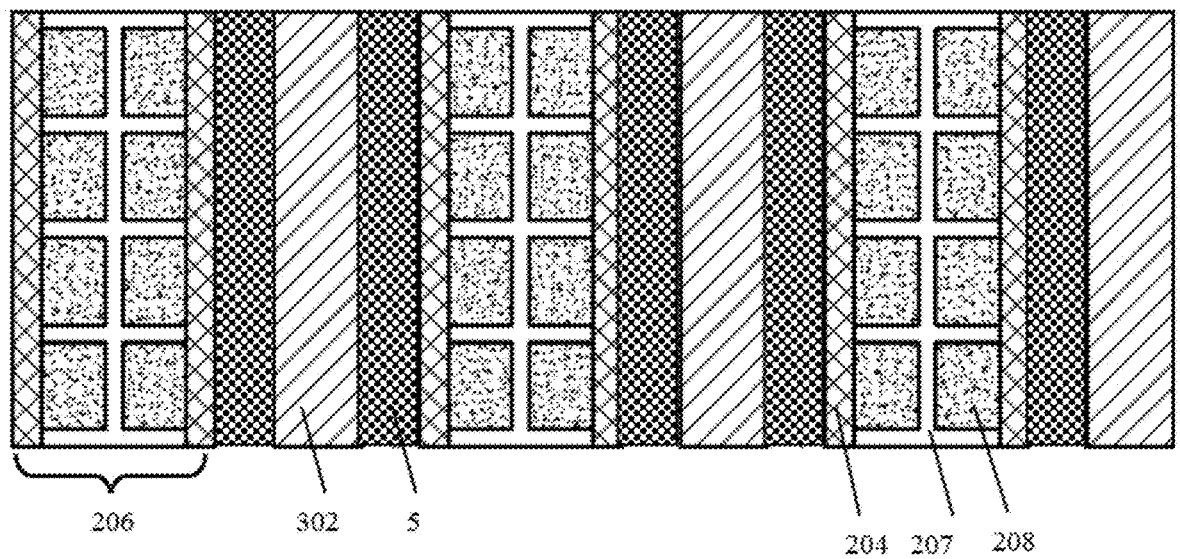
FIG. 2 is a schematic representation of the no-liquid cell for lithium slurry battery according to the second Example of the present disclosure.

FIG. 2 is a schematic representation of the no-liquid cell for lithium slurry battery according to the second Example of the present disclosure. The cell-core of the lithium slurry battery includes a plurality of positive electrode pieces, a plurality of negative electrode pieces, and separating layer 5 between the positive electrode piece and the negative electrode piece. Therein, the plurality of negative electrode pieces and the plurality of positive electrode pieces are stacked alternatively to form a no-liquid cell. In this example, the positive electrode piece is a multi-grid positive electrode piece 206, and the negative electrode piece is a lithium-containing metal body 302. The multi-grid positive electrode piece 206 comprises a cathode surface current-collecting layer 204 and a positive electrode grid 207, and the cathode surface current-collecting layer 204 is in close electrical contact with the positive electrode grid 207. The grid unit 208 of the positive electrode grid has a recess-like blind-hole structure, and the electric-conductive cathode particles are located in the grid unit 208 of the positive electrode grid 207.

Figure 3:
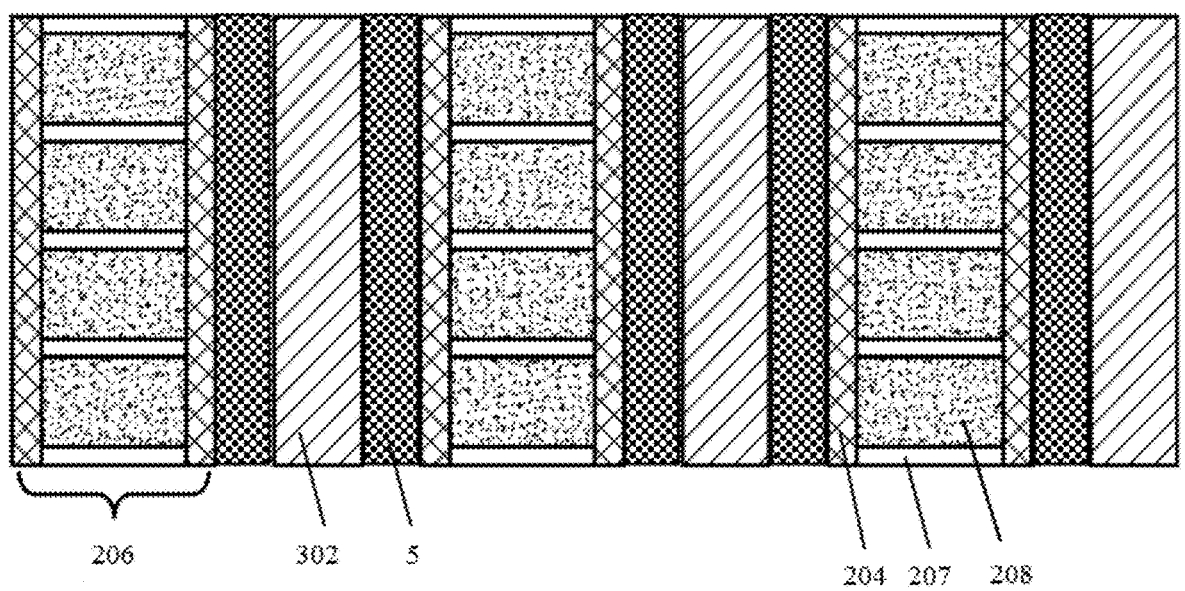
FIG. 3 is a schematic representation of the no-liquid cell for lithium slurry battery according to the third Example of the present disclosure.

FIG. 3 is a schematic representation of the no-liquid cell for lithium slurry battery according to the third Example of the present disclosure. The cell of the lithium slurry battery comprises a plurality of positive electrode pieces, a plurality of negative electrode pieces, and separating layer 5 between the positive electrode piece and the negative electrode piece. Therein, the plurality of negative electrode pieces and the plurality of positive electrode pieces are stacked to form a no-liquid cell. In this example, the positive electrode piece is a multi-grid positive electrode piece 206, and the negative electrode piece is a lithium-containing metal body 302. The multi-grid positive electrode piece 206 comprises a cathode surface current-collecting layer 204 and a positive electrode grid 207, and the cathode surface current-collecting layer 204 is in close electrical contact with the positive electrode grid 207. The grid unit 208 of the positive electrode grid has a through-hole structure, and the electric-conductive cathode particles are located in the grid unit 208 of the positive electrode grid 207.

Figure 4:
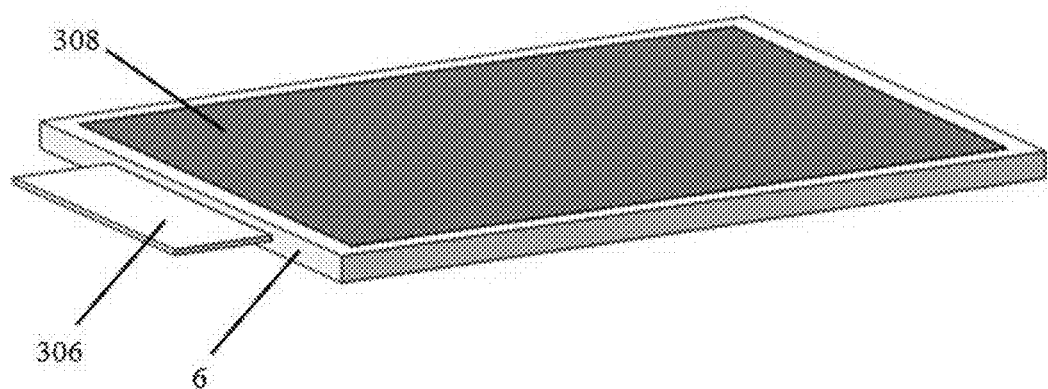
FIG. 4 is a schematic representation of a pole piece for the lithium slurry battery according to the present disclosure.

FIG. 4 is a schematic representation of a pole piece for the lithium slurry battery according to the present disclosure. Taking the negative electrode piece as an example, the negative electrode piece includes an insulation sealing frame 6 and a sandwich composite structure 308 consisting of, for example, two leakage-preventing separating layers, two first anode current-collecting layers, and an electric-conductive lithium-intercalatable anode layer. The insulating sealing frame 6 is provided on the peripheral edges of the sandwich composite structure 308. The insulation sealing frame 6 has a "⊢" shape and is fixedly sealed with the peripheral edge of the sandwich composite structure 308. The negative electrode piece further includes a negative electrode tab 306, and the negative electrode tab 306 can be electrically connected to both the first anode current-collecting layer and the electric-conductive lithium-intercalatable anode layer.

Figure 5:
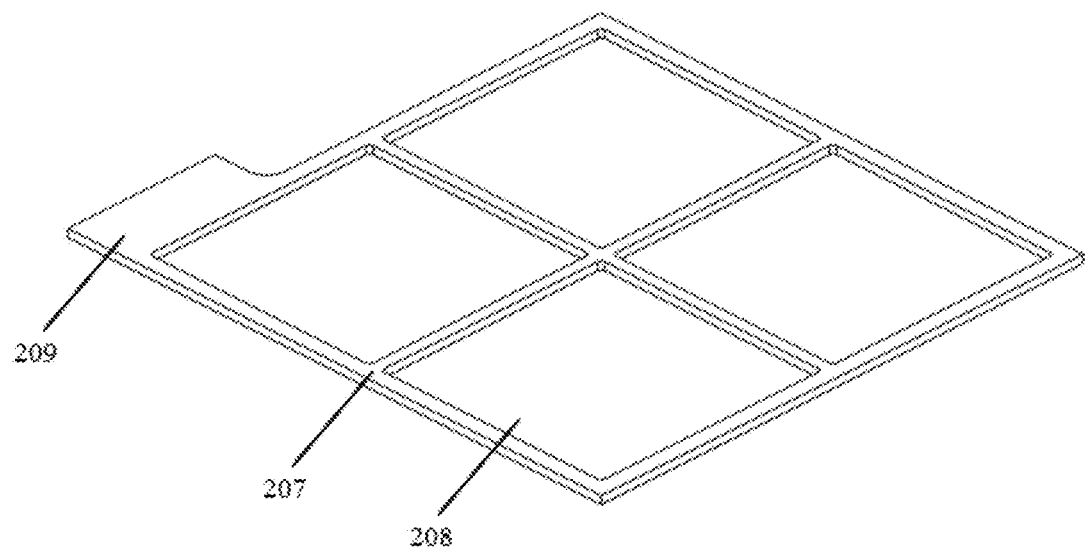
FIG. 5 is a schematic representation of a positive electrode grid for the lithium slurry battery according to the present disclosure.

FIG. 5 is a schematic representation of a positive electrode grid for the lithium slurry battery according to the present disclosure. The positive electrode piece includes a positive electrode grid 207 and electric-conductive cathode particles without adhesive bonding. The positive electrode grid 207 is provided with four square grid units 208 which are independent of each other, and the grid units 208 have through-hole structures. The accumulated state electric-conductive cathode particles may be filled in each of the grid unit 208 to form an electric-conductive cathode layer. The positive electrode tab 209 of the positive electrode piece can be integrally formed with the positive electrode grid 207.

Figure 6:
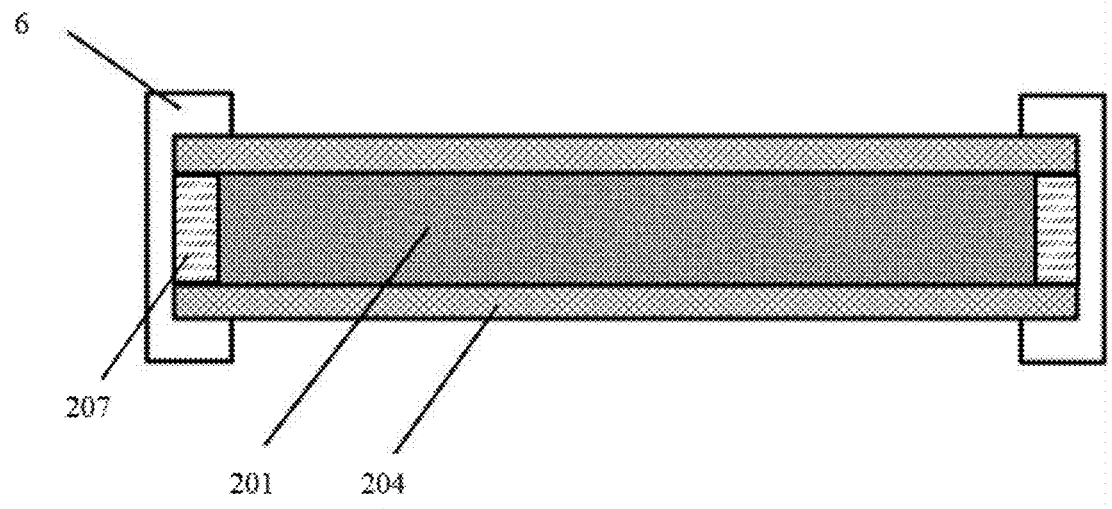
FIG. 6 is a schematic representation of a section of the positive electrode piece for the lithium slurry battery according to the first example of the present disclosure.

FIG. 6 is a schematic representation of a section of the positive electrode piece for the lithium slurry battery according to the first example of the present disclosure. In this example, the positive electrode piece includes a sandwich composite structure consisting of a positive electrode grid 207, two cathode surface current-collecting layers 204, and an electric-conductive cathode layer 201, and an insulation sealing frame 6 located around the sandwich composite structure. The cathode surface current-collecting layer 204 is an aluminum mesh with a thickness of 2000 μm, a through-hole porosity of 50%, and a pore diameter of 2 mm. In the electric-conductive cathode layer, the cathode active material, conductive agent and the binder are uniformly mixed at a mass ratio of 45:50:5, wherein the cathode active material is lithium iron phosphate, the conductive agent is conductive carbon black, the binder is made of polyvinylidene fluoride, and the thickness of the positive electrode active layer is 10 mm.

Figure 7:
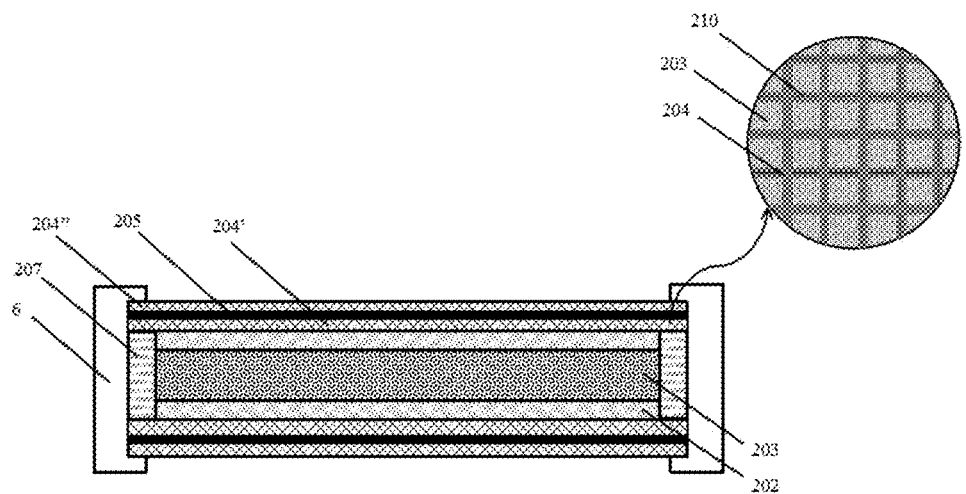

FIG. 7 is a schematic representation of a section of the positive electrode piece for the lithium slurry battery according to the second example of the present disclosure and local details of which. In this example, the positive electrode piece includes a sandwich composite structure consisting of a positive electrode grid 207, two cathode surface current-collecting layers 204, and an electric-conductive cathode layer, and an insulation sealing frame 6 located around the sandwich composite structure. The electric-conductive cathode layer includes a first electric-conductive cathode layer 202 and a second electric-conductive cathode layer 203. The electric-conductive cathode particles of the first electric-conductive cathode layer 202 partially penetrate into the cathode surface current-collecting layer 204, and the second electric-conductive cathode layer electric-conductive cathode layer 203 is located between the two first electric-conductive cathode layers 202. The cathode surface current-collecting layer 204 includes a two-layer structure 204', 204" and a leakage-preventing porous layer 205 between the two-layer structure. The cathode surface current-collecting layer with a two-layer structure and the leakage-preventing porous layer located therebetween are combined into one body, which can play the role of both collecting current and prevent leakage. In addition, it can be seen from the partial detail view that an interface-improving layer 210 is coated on the grid of the cathode surface current-collecting layer 204.

The cathode surface current-collecting layer 204 is made of stainless steel mesh, and it has a thickness of 0.01 μm, a through-pore porosity of 90% and a pore diameter of 0.005 mm. The interface-improving layer 210 comprises a conductive agent and a binder, and the mass ratio of the binder to the conductive agent is 20:80, wherein the conductive agent is carbon black, and the binder is polyvinylidene fluoride. The leakage-preventing porous layer 205 is made of a polyester nonwoven fabric. In the first positive electrode active layer, the cathode active material, conductive agent and the binder are uniformly mixed at a mass ratio of 90:5:5. The second positive active layer is in close contact with the first positive active layer, and the electric-conductive cathode particles in the second positive active layer only contain a conductive agent. The cathode active material is lithium cobaltate, the conductive agent is graphene, and the binder is a mixture of styrene-butadiene rubber and carboxymethyl cellulose. The total thickness of the first positive active layer and the second positive active layer was 3 mm.

Figure 8:
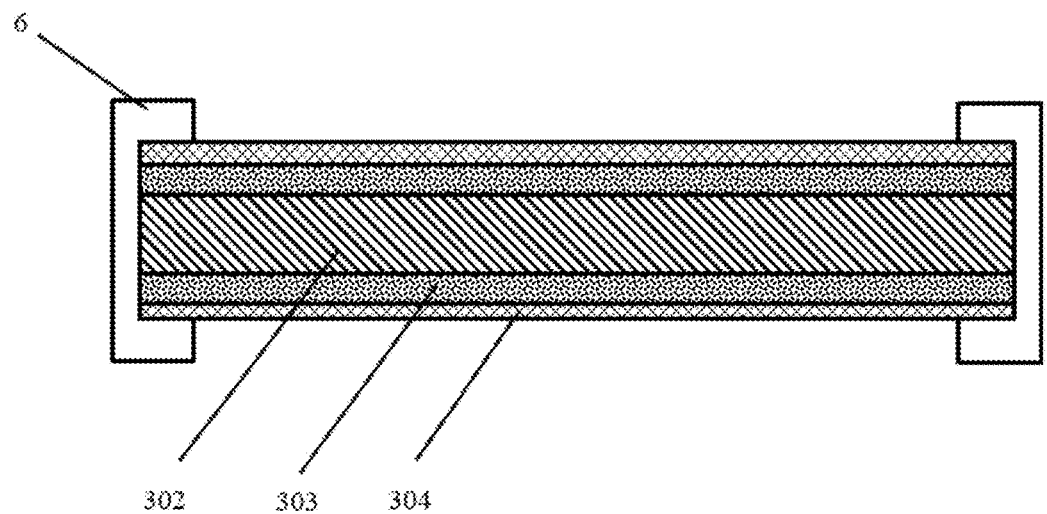
FIG. 8 is a schematic representation of a section of the negative electrode piece for the lithium slurry battery according to the first example of the present disclosure.

FIG. 8 is a schematic representation of a section of the negative electrode piece for the lithium slurry battery according to the first example of the present disclosure. In this example, the negative electrode sheet includes a sandwich composite structure consisting of a electric-conductive lithium-intercalatable anode layer and two first anode current-collecting layers 304, and an insulation sealing frame 6 located around the sandwich composite structure. The electric-conductive lithium-intercalatable anode layer includes a lithium-containing metal body 302 and the negative lithium-intercalatable conductive particle layer 303 located on both sides of the lithium-containing metal body 302. After immersing in the electrolyte, the negative lithium-intercalatable conductive particle layer 303 forms a negative electrode slurry. That is to say, the negative electrode slurry is a mixture of the lithium-intercalatable material, the conductive agent and the electrolyte, wherein the lithium-intercalatable material has a volume content of 10% to 80%, and the conductive agent has a volume content of 0.1% to 5%. The material of the lithium-containing metal body 302 is metal lithium, the lithium-incorporating material is graphite, and the conductive agent is Ketjenblack.

When the lithium slurry battery is overcharged or fast charged at a high rate, lithium ions will be intercalated in the lithium-intercalatable material of the negative electrode slurry. Thus, the lithium ion intercalation reaction occurring on the negative electrode will not develop into a deposition of lithium metal on the surface of the negative electrode, and the growth of lithium dendrites can also be prevented by the rheological action of the negative electrode slurry. Therefore, formation of lithium dendrites on the surface of the negative electrode piece is avoided. In addition, when the negative electrode slurry contains the lithium embeddable material, the negative electrode slurry also has a function of storing lithium during charging. Therefore, in the discharge process of the battery, lithium ions can be deintercalated from the lithium-containing metal body, and can be deintercalated from the lithium-intercalatable material of the negative electrode slurry, thereby increasing the storage capacity of the battery.

Figure 9:
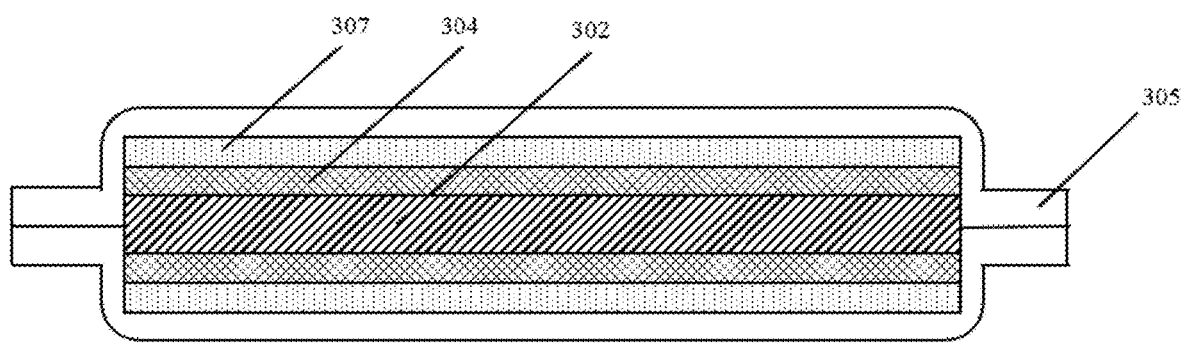
FIG. 9 is a schematic representation of a section of the negative electrode piece for the lithium slurry battery according to the second example of the present disclosure.

FIG. 9 is a schematic representation of a section of the negative electrode piece for the lithium slurry battery according to the second example of the present disclosure. In this example, the negative electrode piece comprises a single-layer electric-conductive lithium-intercalatable anode layer, two first anode current-collecting layers 304, two lithium-intercalatable foil layers 307, and two leakage-preventing separating layers 305, wherein the electric-conductive lithium-intercalatable anode layer is a lithium-containing metal body 302. Two first anode current-collecting layers 304 are respectively provided on both sides of the lithium-containing metal body 302. The lithium-containing metal body 302 is fixed to the first anode current-collecting layer 304 by soldering. The lithium-intercalatable foil layer 307 is bonded to the side of the first anode current-collecting layer 304 that is not in contact with the lithium-containing metal body 302 by a conductive adhesive. The material of the lithium-containing metal body 302 is lithium-based alloy, the material of the first anode current-collecting layer 304 is copper, and the material of the lithium-intercalatable foil layer 307 is an aluminum-based alloy.

During the first several charge and discharge cycles of the lithium slurry battery, lithium ions are intercalated in and deintercalated from the lithium-intercalatable foil layer, and the lithium-intercalatable foil layer is pulverized in situ into a lithium-intercalatable porous layer. The lithium-intercalatable porous layer not only allows lithium ions to pass smoothly, but also intercalates lithium ions into its lithium-intercalatable material under conditions of overcharge or fast charge at high rate. Thus, the lithium ion intercalation reaction occurring on the negative electrode will not develop into a deposition of lithium metal on the surface of the negative electrode, avoiding the formation of lithium dendrites on the surface of the lithium-containing metal body. The ends of the two leakage-preventing separating layers located at the outermost side of the negative electrode piece are joined together by bonding to form an insulation sealing around the peripheral edge of the negative electrode piece. The pulverization lithium-intercalatable material of the lithium-intercalatable foil layer is partially bonded to the current collecting layer and partially enters the electrolyte in the negative electrode piece. The leak-preventing separating layer prevents the powdered lithium-intercalatable material from leaking into the electrolyte outside the negative electrode piece.

Figure 10:
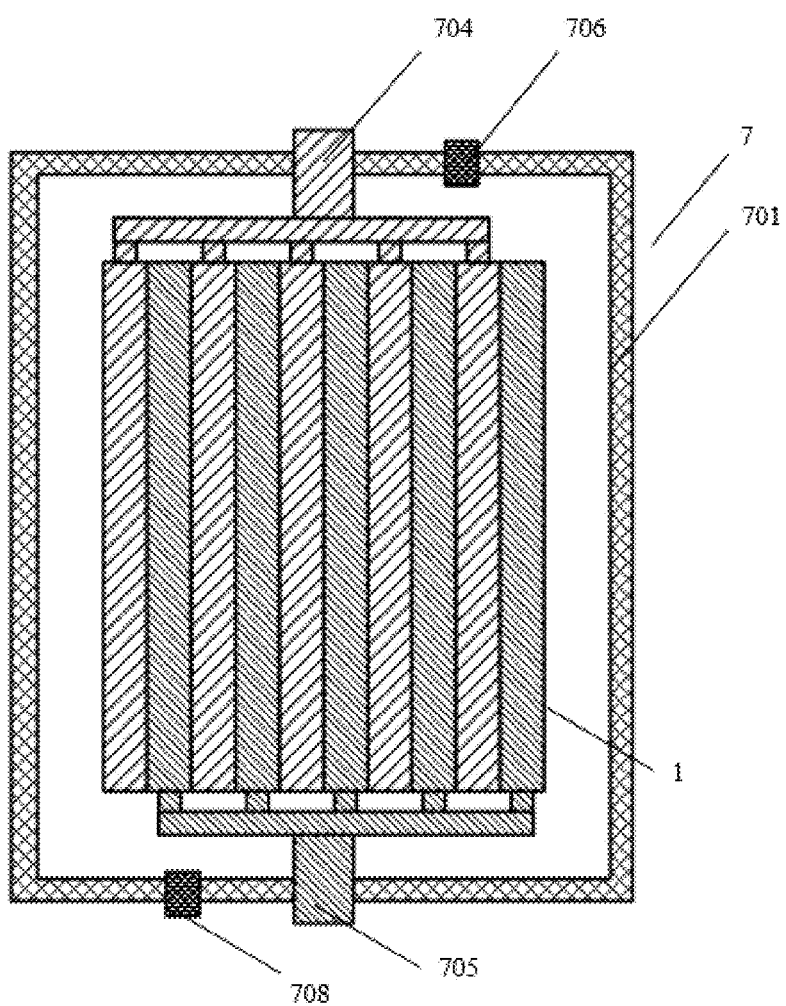
FIG. 10 is a schematic representation of a cell for the lithium slurry battery according to the present disclosure.

FIG. 10 is a schematic representation of a cell for the lithium slurry battery according to the present disclosure. The lithium slurry battery cell 7 includes a shell of battery cell 701, a positive terminal 704, a negative terminal 705, a cell-core 1, a liquid injection interface 706, a discharge interface 708, and an electrolyte. Therein, the cell-core 1 is disposed in cell can 701 of the battery cell. The plurality of the positive electrode tabs of the cell-core 1 are electrically connected to the positive terminal 704. The plurality of the negative electrode tabs of the cell-core 1 are electrically connected to the negative terminal 705. The positive terminal 704 and the negative terminal 705 protrude from the shell of battery cell 701 and are fluid sealed with the cell can of the battery cell. The electrolyte is injected into the shell of battery cell 701 through the liquid injection interface 706, so that the cell-core 1 is placed in the electrolyte, so that the accumulation state electric-conductive cathode particles and the electric-conductive lithium-intercalatable anode particles in the positive electrode piece and the negative electrode piece form the positive electrode slurry and the negative electrode slurry. In addition, the separating space is filled with the electrolyte and the separating layer between the positive electrode piece and the negative electrode piece is wetted.

Figure 11:
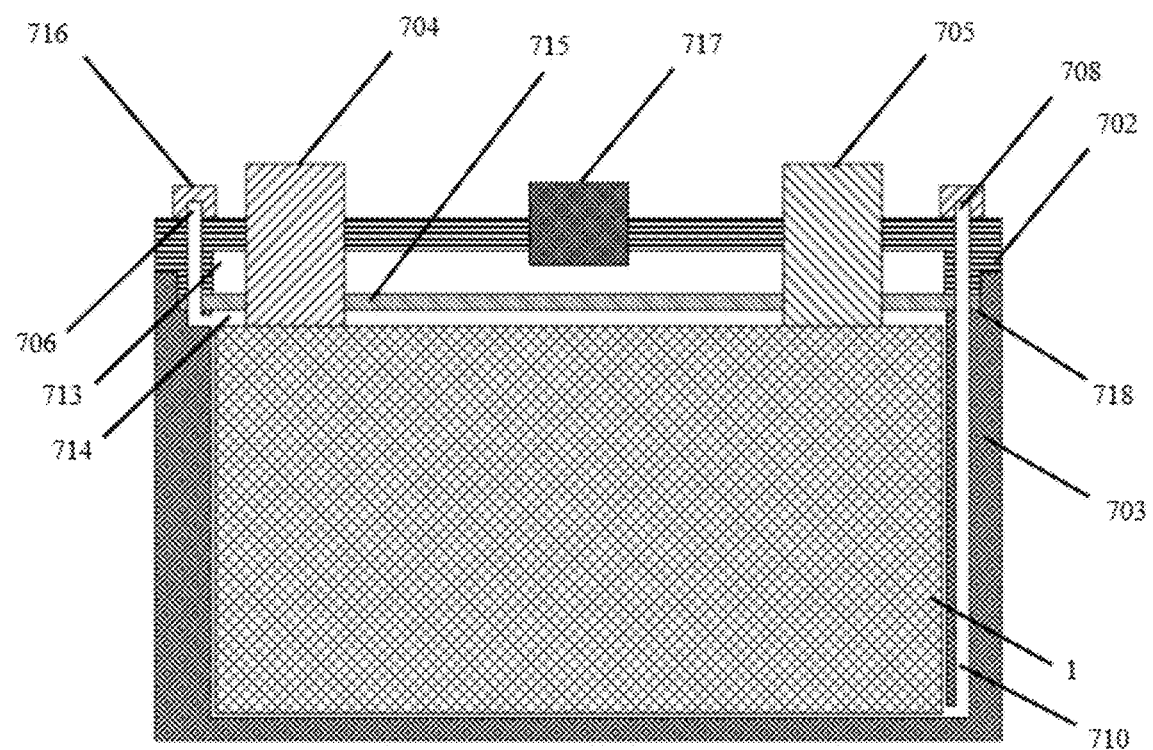
FIG. 11 is a schematic representation of a cell for the lithium slurry battery according to an example of the present disclosure.

FIG. 11 is a schematic representation of a cell for the lithium slurry battery according to the first example of the present disclosure. In addition to the components of cell of the lithium slurry battery shown in FIG. 10, the cell for the lithium slurry battery may further includes an discharge passage 710, a cell inner chamber division plate 715, a sealing cover of the interface 716, and a gas pressure regulating valve 717. In addition, the shell of battery cell 701 in the FIG. 10 is consisting of a top lid of the shell 702 and a lower case of the shell 703. The top lid of the shell 702 and the lower case of the shell 703 are connected by a detachable connecting part to form an inner chamber of the shell. A division plate connecting part 718 is provided on the lower case of the shell 703, and the battery cell inner chamber division plate 715 and the division plate connecting part 718 are connected and fixed by bonding, thereby dividing the inner chamber of the shell into a first inner chamber of the battery cell 713 and a second inner chamber of the battery cell 714 which are independent of each other and are not communicated to each other. The first inner chamber of the battery cell 713 can be filled with dry gas through the gas pressure regulating valve 717, so that the gas pressure P1 in the first inner chamber of the battery cell 713 is higher than the gas pressure P2 in the second inner chamber of the battery cell 714, so as to form a secondary sealing between the battery cell inner chamber division plate 715 and the division plate connecting part 718 of the lower case of the shell 703. The injection interface 706 is in fluid communication with the second inner chamber of the battery cell 714, the discharge interface 708 is in fluid communication with the second inner chamber of the battery cell 714 via the discharge passage 710, and the injection interface 706 and the discharge interface 708 are sealed with the sealing cover of the interface 716.

Figure 12:
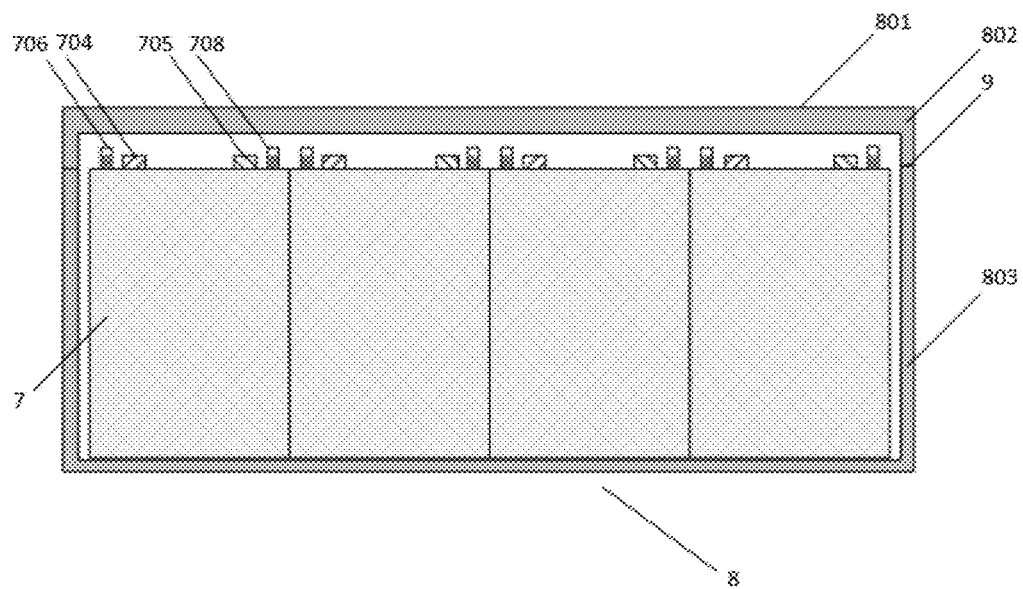
FIG. 12 is a schematic representation of an electrolyte-replaceable lithium slurry battery module according to the first example of the present disclosure.

FIG. 12 is a schematic representation of a liquid-exchangeable lithium slurry battery module according to the first example of the present disclosure. The liquid-exchangeable lithium slurry battery module 8 includes a cell can 801 and a plurality of cells of the lithium slurry battery 7. The cell can 801 includes a top lid of the cell can 802 and a lower housing of the cell can 803, and the top lid of the cell can 802 and the lower housing of the cell can 803 form an inner chamber of the cell can. A detachable connecting part 9 is provided on the top lid of the cell can 802 and the lower housing of the cell can 803, and the top lid of the cell can 802 and the lower housing of the cell can 803 can be easily detached and reinstalled by the bolt connection of the detachable connecting part 9. The cell of the lithium slurry battery 7 is disposed in the inner chamber of the cell can, and the cell of the lithium slurry battery 7 is provided with a positive terminal 704, a negative terminal 705, an injection interface 706, and a discharge interface 708. Therein, the injection interface 706 and the discharge interface 708 can be quickly connected with or disconnected from the interface of the pump and the liquid injection device. In addition, the injection interface 706 and the discharge interface 708 automatically open when the injection interface 706 and the discharge interface 708 engage with the interface of the pump or the liquid-injecting device, and the injection interface 706 and the discharge interface 708 automatically close after the connection is broken.

Hereinafter, a method for exchanging the liquid of the liquid-exchangeable lithium slurry battery module will be described in conjunction with the liquid-exchangeable lithium slurry battery module according to the first example of the present disclosure. Firstly, the liquid-exchangeable lithium slurry battery module 8 is discharged. After the discharge is completed, the bolt connecting portions of the top lid of the cell can 802 and the lower housing of the cell can 803 are disassembled, and the top lid of the cell can 802 is removed from the lower housing of the cell can 803. The SEI film on the surface of the materials of the positive and negative electrode and on the surface of the current collector in the cell of the lithium slurry battery is destroyed by ultrasonic heating. Then, the electrolyte in the cell of the lithium slurry battery 7 is drawn from the discharge interface 708 by a liquid pump. Next, the cell of the lithium slurry battery 7 is evacuated from the discharge interface 708 with a vacuum pump. Thereafter, the washing liquid is injected into the cell of the lithium slurry battery 7 through the injection interface 706 with the liquid-injecting device, and the washing liquid and impurities in the cell of the lithium slurry battery 7 are extracted by the liquid pump through the discharge interface 708, and the step is repeated three times. The vinylene carbonate-added electrolyte is then injected into the cell of the lithium slurry battery 7 through the injection interface 706. After standing at 40° C. for 2 hours, a stable and dense SEI film is formed in the battery by formation, and the electrolyte was drawn from the discharge interface 708 by a liquid pump and the cell of the lithium slurry battery 7 was evacuated by a vacuum device. Finally, the electrolyte is injected to the cell of the lithium slurry battery 7 through the injection interface 706 by with a liquid injection device.

Figure 13:
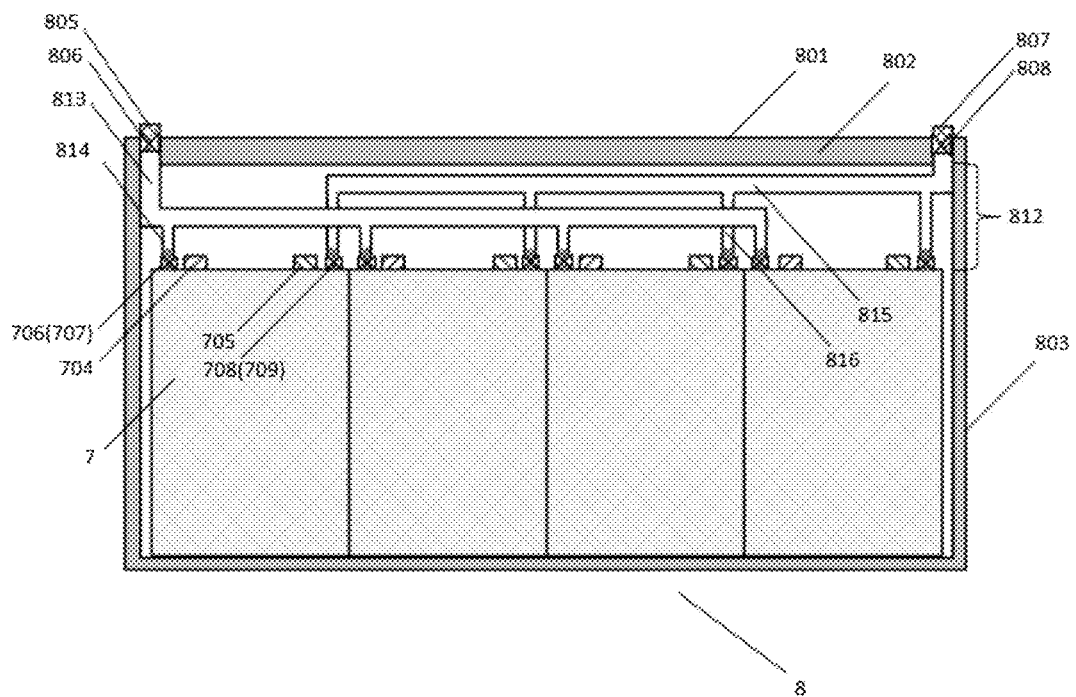
FIG. 13 is a schematic representation of an electrolyte-replaceable lithium slurry battery module according to the second example of the present disclosure.

FIG. 13 is a schematic representation of a liquid-exchangeable lithium slurry battery module according to the second example of the present disclosure. The liquid-exchangeable lithium slurry battery module 8 includes a cell can 801, a plurality of cells of the lithium slurry battery 7, and an integral liquid-exchanging system 812. The cell can 801 includes a top lid of the cell can 802 and a lower housing of the cell can 803, and the top lid of the cell can 802 and the lower housing of the cell can 803 form an inner chamber of the cell can. The top lid of the cell can 802 and the lower housing of the cell can 803 are fixedly connected by welding. There is also a main injection port 805, a valve of the main injection port 806, a main discharge port 807, and a valve of the main discharge port 808 provided on the top lid of the cell can. The cell of the lithium slurry battery 7 is disposed in the inner chamber of the cell can, and the cell of the lithium slurry battery 7 is provided with a positive terminal 704, a negative terminal 705, an injection interface 706, a flow valve of the injection interface 707, a discharge interface 708, and a flow valve of the discharge interface 709. The integral liquid-exchanging system 812 includes a main injection pipe 813, a branch injection pipe 814, a main discharge pipe 815, and a branch discharge pipe 816.

Wherein, the main injection port 805 on the top lid of the cell can 802 is connected to the main injection pipe 813 of the integral liquid-exchanging system 812. The main injection pipe 813 is connected to each branch injection pipe 814, and the branch injection pipes 814 are connected to the injection interfaces 706 of the cells of the lithium slurry battery 7. The main discharge port 807 on the top lid of the cell can 802 is connected to the main discharge pipe 815 of the integral liquid-exchanging system 812. The main discharge pipe 815 is connected to each of the branch discharge pipes 816, which are connected to the discharge interface 708 of the cell of the lithium slurry battery 7. Wherein, the valve of the main injection port valve 806 and valve of the main discharge port 808 can control the total amount of liquid or the total amount of gas entering and exiting the liquid-exchangeable lithium slurry battery module. The flow valve of the injection interface 707 and the flow valve of the discharge interface 709 can control the amount of liquid or gas entering and discharging a single lithium slurry battery cell 7.

Hereinafter, a method for exchanging the liquid of a liquid-exchangeable lithium slurry battery module will be described in conjunction with the second example of the present disclosure. Firstly, the liquid-exchangeable lithium slurry battery module 8 is discharged. The SEI film reaction type breaker acetic acid is injected into each of the cells of the lithium slurry battery through the main injection port 805, meanwhile, combining with high temperature and large current charge and discharge, the SEI film on the material of the positive and negative electrodes in the cell of the lithium slurry battery and the SEI film on the surface of the current collector are destroyed. Then, the electrolyte in all of the cells of the lithium slurry battery 7 is drawn from the main discharge port 807 with a liquid pump. Then, all the cells of the lithium slurry battery 7 are evacuated from the main discharge port 807 with a vacuum pump. Thereafter, the cleaning liquid is injected into all the cells of the lithium slurry battery 7 through the main injection port 805 with the liquid injection device, and the cleaning liquid and impurities in all of the cells of the lithium slurry battery 7 are extracted with the liquid pump through the main discharge port 807. This step is repeated for 4 times. Thereafter, injecting an electrolyte containing an inorganic additive sulfur dioxide into the cell of the lithium slurry battery 7 through the main injection port 805. After standing at 30° C. for 20 hours, a stable and dense SEI film is formed in the battery by method of formation, and the electrolyte is drawn from the main discharge port 807 with a liquid pump and all the cells of the lithium slurry battery 7 are evacuated by a vacuum device. Finally, the electrolyte is injected into the all the cells of the lithium slurry battery 7 through the main injection port 805 by means of the liquid injection device, and a small amount of electrolyte is continuously injected after each cell of the lithium slurry battery 7 is filled with the electrolyte so that each branch injection pipe 814 has a small amount of electrolyte in it. Wherein, the electrolyte injected into the branch injection pipe 814 plays a role of liquid supplement, and also plays a role of liquid-sealing by preventing the external gas from entering the cell of the lithium slurry battery 7.

Figure 14:
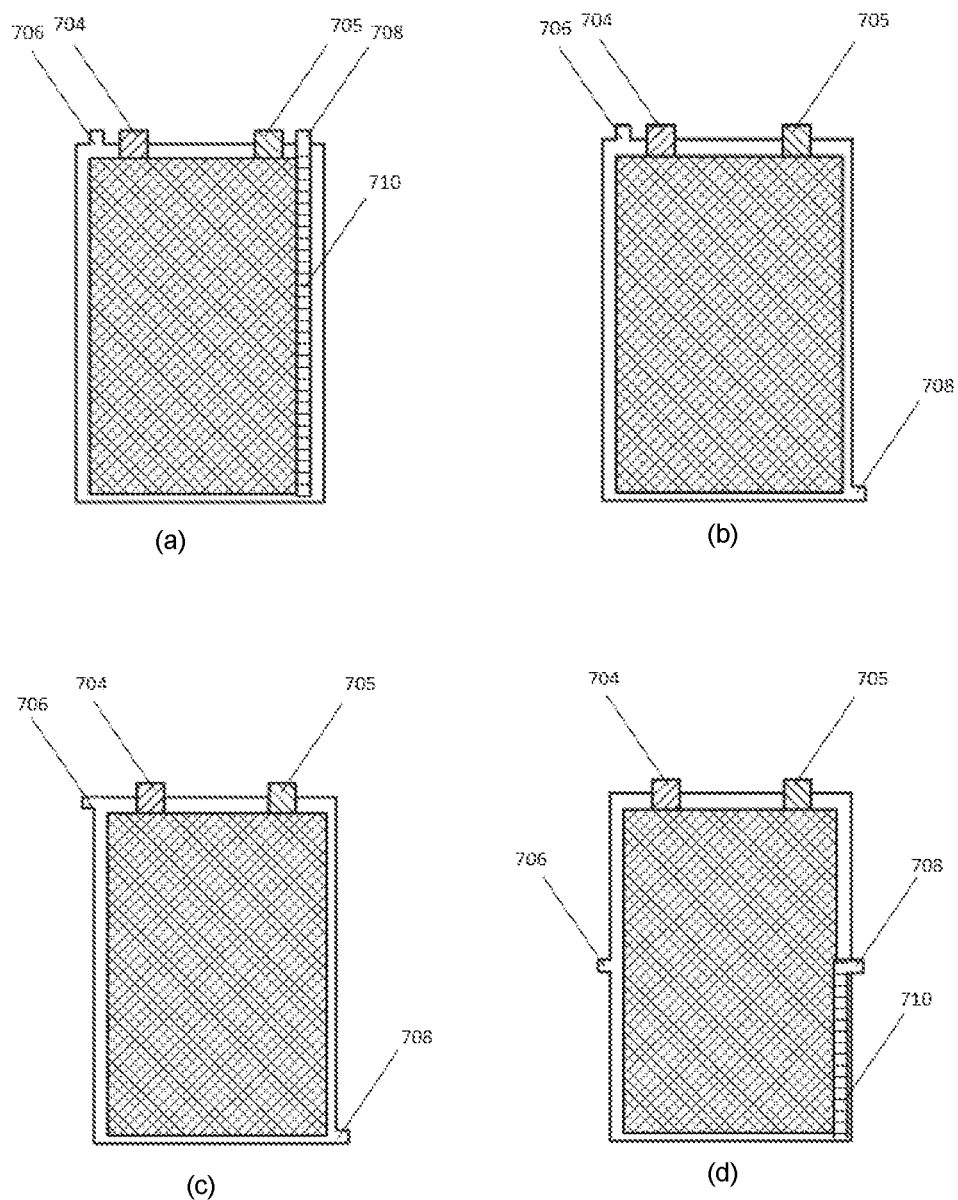
FIG. 14 is a schematic representation of the lithium slurry battery cell of the liquid exchangeable lithium slurry battery module according to the present disclosure, wherein the FIGS. 14a to 14d are numerous examples of cell of the lithium pate battery.

FIGS. 14a to 14d is a schematic representation of several examples of the lithium slurry battery cell of the liquid exchangeable lithium slurry battery module according to the present disclosure. Therein, the cell of the lithium slurry battery 7 includes a shell of battery cell, a cell-core, and an electrolyte. The electrolyte is disposed in the shell of battery cell and the cell-core is immersed in the electrolyte. An injection interface 706 and a discharge interface 708 are provided on the shell of battery cell, and the discharge interface 708 is connected to the discharge passage 710. FIG. 14a is a schematic representation of a lithium slurry battery cell of a liquid exchangeable lithium slurry battery module in accordance with the first example of the present disclosure. Wherein, both the injection interface 706 and the discharge interface 708 are provided on top of the battery cell shell, one end the discharge passage is connected to the discharge interface 708 and the other end extends to the bottom of the battery cell shell. FIG. 14b a schematic representation of a lithium slurry battery cell of a liquid exchangeable lithium slurry battery module in accordance with the second example of the present disclosure. Wherein, the injection interface 706 is disposed at the top of the battery cell shell, and the discharge interface 708 is disposed at the bottom end of the side wall of the battery cell shell. FIG. 14c is a schematic representation of a lithium slurry battery cell of a liquid exchangeable lithium slurry battery module in accordance with the third example of the present disclosure. Wherein, the injection interface 706 is disposed at the top end of the side wall of the battery cell shell, and the discharge interface 708 is disposed at the bottom end of the side wall of the battery cell shell. FIG. 14d is a schematic representation of a lithium slurry battery cell of a liquid exchangeable lithium slurry battery module in accordance with the fourth example of the present disclosure. Wherein, the injection interface 706 and the discharge interface 708 are both disposed in the middle of the side wall of the battery cell shell, and one end of the discharge passage 710 is connected to the discharge interface 708 and the other end extends to the bottom of the battery cell shell. The above embodiments shows only the cells of the lithium slurry battery according to the present disclosure by means of example, and the arrangement and position of the injection interface, the discharge port, and the discharge passage are not limited to the above embodiments.

Figure 15:
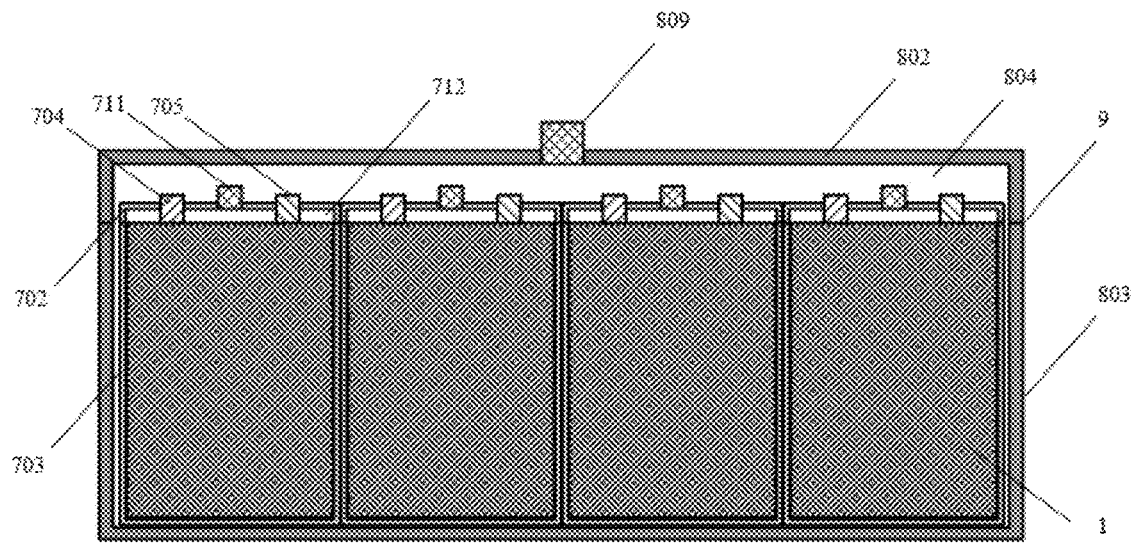
FIG. 15 is a schematic representation of the section of the gas-sealed detachable lithium slurry battery module in the third example of the present disclosure.

FIG. 15 is a schematic representation of the section of the gas-sealed detachable lithium slurry battery module in the third example of the present disclosure. Dry gas is filled in the inner chamber of the cell can 804 formed by the top lid of the cell can 802 and the lower housing of the cell can 803 of the lithium slurry battery module, generating a gas pressure P1. In the lithium slurry battery cell, the cell-core 1 is disposed in the electrolyte in the shell of battery cell, and a battery cell inner chamber 712 is formed between the top lid of the shell 702 and the electrolyte liquid level in the battery cell shell. The battery cell inner chamber 712 is filled with a dry gas, generating a gas pressure P2. The gas pressure P1 in the inner chamber of the cell can 804 is greater than the gas pressure P2 in the battery cell inner chamber 712. With the pressure difference, the top lid of the shell 702 and the lower case of the shell 703 of the lithium slurry battery cell always maintain a positive pressure press fitting in certain rang. For example, the inner chamber of the cell can 804 has a gas pressure P1 of 1.5 atmosphere pressure and a predetermined gas pressure range of 1 to 2 atmosphere pressure. The battery cell inner chamber 712 has a gas pressure P2 of 0.5 atmosphere pressure and a predetermined gas pressure range of 0.4 to 0.6 atmosphere pressure. In addition, in order to ensure the safety performance of the lithium slurry battery, the gas pressure inside the lithium slurry battery module and the cell of the lithium slurry battery is controlled by the pressure regulating valve and the exhaust valve, thereby effectively preventing explosion caused by excessive internal pressure. For example, when the gas pressure P2 of the battery cell inner chamber 712 is greater than 0.6 atmosphere pressure, the gas in the battery cell inner chamber 712 will enter the inner chamber of the cell can 804 via the exhaust valve 711 on the top lid of the shell 702. When the air pressure P1 of the inner chamber of the cell can 804 is greater than 2 atmosphere pressure, the gas in the inner chamber of the cell can 804 will be discharged through the gas pressure regulating valve 809 on the top lid of the cell can 802.

Figure 16:
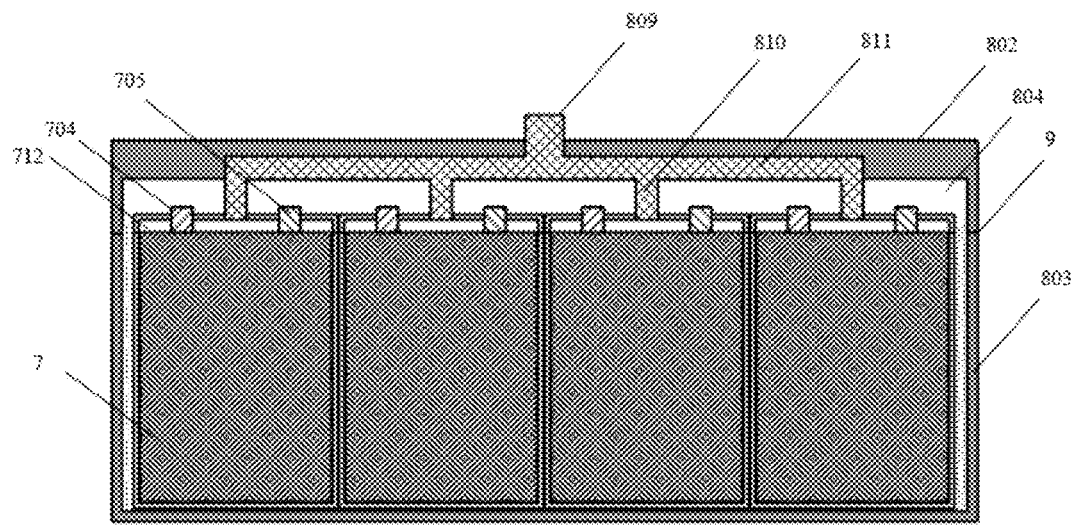
FIG. 16 is a schematic representation of the section of the gas-sealed detachable lithium slurry battery module in the fourth example of the present disclosure.

FIG. 16 is a schematic representation of the section of the gas-sealed detachable lithium slurry battery module in the fourth example of the present disclosure. The difference between the lithium slurry battery module shown in FIG. 16 and the lithium slurry battery module shown in FIG. 15 is that electrolyte solvent and dry gas are accommodated in the inner chamber of the cell can 804 of the lithium slurry battery module. The liquid level of the electrolyte solvent is higher than the top lid detachable connecting part of the top lid of the shell of the lithium slurry battery cell, so that an effective liquid sealing can be formed for the detachable connecting part. Further, in this example, the gas discharged from the cell of the lithium slurry battery 7 does not enter the inner chamber of the cell can 804, but is directly discharged to the atmosphere or the gas collection device. The exhaust port of the battery cell shell of the cell of the lithium slurry battery 7 is connected to the cell can exhaust port of the lithium slurry battery module through the branch exhaust pipe 810 and the main exhaust pipe 811. When the gas pressure of the battery cell inner chamber 712 is greater than a predetermined value, the gas in the battery cell inner chamber 712 of the lithium slurry battery enters the branch exhaust pipe 810 via the exhaust valve of the battery cell housing exhaust port. When the gas pressure in the main exhaust pipe 811 is greater than a predetermined value, the gas in the main exhaust pipe 811 is discharged to the atmosphere or gas collection device via gas pressure regulating valve 809 of the cell can exhaust port.

Figure 17A:
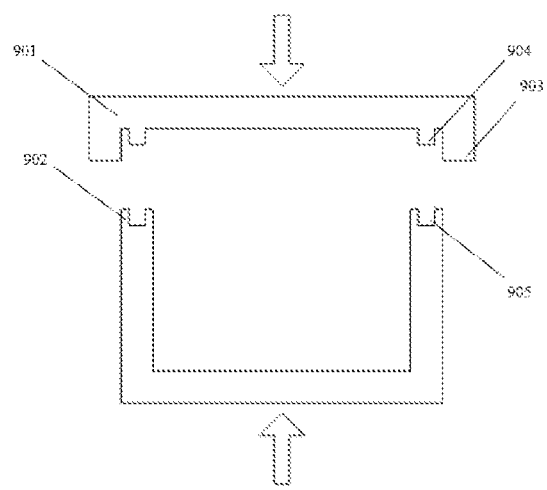
FIG. 17 is a schematic representation of the detachable connecting part of the cell of the lithium slurry battery or the lithium slurry battery module according to the present disclosure, wherein the FIGS. 17a to 17c are numerous examples of the detachable connecting part.
Figure 17B:
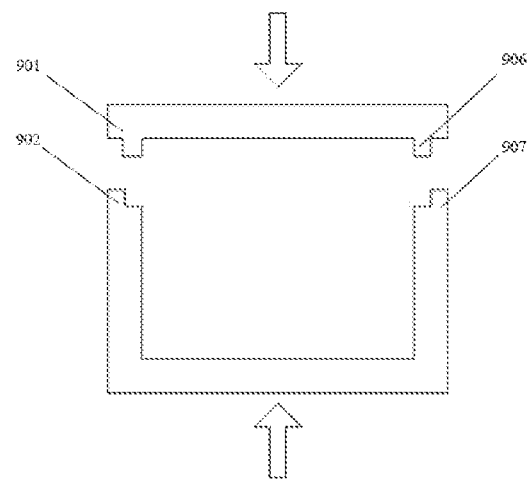
Figure 17C:
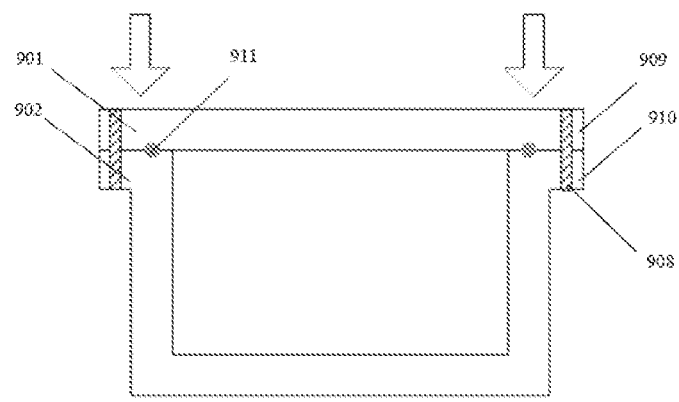

FIGS. 17a to 17c are schematic representations of the detachable connecting part of the cell of the lithium slurry battery or the lithium slurry battery module according to the present disclosure. Hereinafter, the cell of the lithium slurry battery is taken as an example to describe the detachable connecting part of the shell of the lithium slurry battery cell. It will be understood that the detachable connecting part of the cell can of the lithium slurry battery module may also be in the same or similar manner. Wherein, the top lid of the shell of the lithium slurry battery cell is provided with a top lid detachable connecting part 901, and the lower case of the shell is provided with a lower case detachable connecting part 902. In the example illustrated in FIG. 17a, the detachable connecting part of the top lid of the shell includes a protruded portion of outer ring 903 and a protruded portion of inner ring 904, and the detachable connecting part of the lower case of the shell includes a recessed portion 905. Wherein, the shape of protruded portion of inner ring 904 matches with the shape of the recessed portion 905. That is, the protruded portion of the inner ring 904 can be engaged with the recessed portion 905 to form a close fit. The protruded portion of outer ring 903 can be engaged with the lower case of the shell to form a close fit. In the example shown in FIG. 17b, the top lid detachable connecting part 901 of the top lid of the shell includes an upper stair portion 906, and the lower case detachable connecting part 902 of lower case of the shell includes a lower stair portion 907. The upper stair portion 906 and the lower stair portion 907 are complementary in shape and can be closely bonded together by a sealant. In the example shown in FIG. 17c, the top lid detachable connecting part 901 of the top lid of the shell includes an upper lug 909 provided with a bolt hole 908 and a groove of the sealing ring 911, and the lower case detachable connecting part 902 of the lower case of the shell includes a lower lug 910 provided with a bolt hole 908 and a groove of the sealing ring 911. The upper lug 909 and the lower lug 910 can be tightly engaged with bolts and a sealing ring is provided in the groove of the sealing ring 911. It should be noted here that the various parts of the above detachable connecting parts can be used individually or in combination. In addition, conventional connection methods that can be conceived by one of ordinary skill in the art can also be applied here.

The specific embodiments of the invention are not intended to limit the invention. One of ordinary skill in the art can make various possible changes and modifications to the technical solutions of the present invention, or modify them to equivalent variations, without departing from the scope of the present invention. Thus, any simple modifications, equivalent changes, and modifications made to the above embodiments in accordance with the technical spirit of the present invention are still within the scope of protection of the technical solutions of the present invention.

What is claimed is:

1. A no-liquid cell for lithium slurry battery, comprising multiple positive electrode pieces and negative electrode pieces overlapping alternately, wherein
   the positive electrode piece comprises a positive electrode grid, electric-conductive cathode particles and a cathode surface current-collecting layer,
      the positive electrode grid is a rigid or flexible supporting body with one or more independent grid units, and the grid unit is a through-hole or a recess-like blind-hole;
      the electric-conductive cathode particles are filled in the grid unit of the positive electrode grid to form an electric-conductive cathode layer,
      the electric-conductive cathode layer contains a part or all of the electric-conductive cathode particles in accumulated state without adhesive bonding, and the accumulated state includes powders accumulation, pressed sheet or pressed block, and
      the electric-conductive cathode particles are compound or mixture of a cathode active material and a conductive agent,
      the cathode surface current-collecting layer is fixed to the surface of the positive electrode grid, and the fixing manner includes adhesive bonding, mechanical pressing, coating, hot pressing or welding,
   the negative electrode piece comprises a electric-conductive lithium-intercalatable anode layer, wherein
      the electric-conductive lithium-intercalatable anode layer is a lithium-containing metal body and/or a layer containing a part or all of electric-conductive lithium-intercalatable anode particles in accumulated state without adhesive bonding, and the accumulated state includes powders accumulation, pressed sheet and pressed block,
      the electric-conductive lithium-intercalatable anode particles are compound or mixture of a lithium-intercalatable anode material and a conductive agent, and
   the peripheral edge of the positive electrode piece and/or the negative electrode piece is insulated and sealed.

2. The no-liquid cell for lithium slurry battery according to claim 1, wherein a separating space is provided between the positive electrode piece and the negative electrode piece, and the height of the separating space is from 0.01 mm to 1 mm.

3. The no-liquid cell for lithium slurry battery according to claim 2, wherein one or more separating layers are provided in the separating space, and the separating layer provides electrical insulation between the positive electrode piece and the negative electrode piece,
the separating layer is fixed to the surface of the positive electrode piece and/or the negative electrode piece, the fixing manner includes adhesive bonding, mechanical pressing, coating, hot pressing or welding; or, the separating layer is clamped between the positive electrode piece and the negative electrode piece; or, the separating layer is wrapped on the surface of the positive electrode piece and/or the negative electrode piece,
the material of the separating layer is an electric-insulating porous polymer material; or, the material of the separating layer is an electric-insulating porous material composed of an inorganic nonmetal material and an organic polymer; or, the material of the separating layer is an electric-insulating gel polymer electrolyte composite material composed of a polymer matrix, a liquid organic plasticizer and a lithium salt; or, the material of the separating layer is an electric-insulating porous polymer material or a porous polymer material composed of an inorganic nonmetal material and an organic polymer, with a pore thereof filled with an ion-conductive electrolyte or a polymer colloidal material.

4. The no-liquid cell for lithium slurry battery according to claim 1, wherein the accumulation porosity of the electric-conductive cathode particles without adhesive bonding and/or the electric-conductive lithium-intercalatable anode particles without adhesive bonding is more than 5% and less than 60%; when immerging in an electrolyte, the electric-conductive cathode particles without adhesive bonding and/or the electric-conductive lithium-intercalatable anode particles without adhesive bonding can move in the electrolyte and independently form a positive electrode slurry and/or a negative electrode slurry; the electric-conductive cathode particles account for 10% to 90% of the mass of the positive electrode slurry, and the electric-conductive lithium-intercalatable anode particles account for 10% to 90% of the mass of the negative electrode slurry.

5. The no-liquid cell for lithium slurry battery according to claim 1, wherein the electric-conductive cathode particles have a mean particle diameter of 0.05 to 500 µm, and the mass ratio of the cathode active material to the conductive agent is 20 to 98:80 to 2; wherein the electric-conductive lithium-intercalatable anode particles have a mean particle diameter of 0.05 to 500 µm, and the mass ratio of the lithium-intercalatable anode material to the conductive agent is 20 to 98:80 to 2.

6. The no-liquid cell for lithium slurry battery according to claim 1, wherein the cathode active material is selected from the group consisting of lithium iron phosphate, lithium manganese phosphate, lithium silicate, lithium iron silicate, sulfate compounds, sulfur carbon composite, sulfur, titanium sulfur compound, molybdenum sulfur compound, iron sulfur compound, doped lithium manganese oxide, lithium cobalt oxide, lithium titanium oxide, lithium vanadium oxide, lithium nickel manganese oxide, lithium nickel cobalt oxide, lithium nickel cobalt aluminum oxide, lithium nickel aluminum oxide, lithium nickel cobalt manganese oxide and lithium iron nickel manganese oxide, or a mixture thereof.

7. The no-liquid cell for lithium slurry battery according to claim 1, wherein the lithium-intercalatable anode material is selected from the group consisting of aluminum-based alloy, silicon-based alloy, tin-based alloy, lithium titanium oxide, lithium silicon oxide, metal lithium powder and graphite, or a mixture thereof, in which lithium ion can be embedded.

8. The no-liquid cell for lithium slurry battery according to claim 1, wherein the conductive agent is selected from the group consisting of carbon black, Ketjenblack, graphene, carbon nanotube, carbon fiber, amorphous carbon, metal conductive particle and metal conductive fiber, or a mixture thereof.

9. The no-liquid cell for lithium slurry battery according to claim 1, wherein the material of the lithium-containing metal body is metal lithium or lithium-based alloy, and the lithium-containing metal body has a thickness of 0.001 to 2 mm.

10. The no-liquid cell for lithium slurry battery according to claim 1, wherein the positive electrode grid has a thickness of 0.5 to 20 mm, and the shape of the grid unit is one or more of circular, square, oval, rhombus, polygon or irregular shapes; the grid unit has a mean hole diameter of 5 to 100 mm; and the volume ratio of all the grid units accounts for 70% to 98% of the volume of the positive electrode grid.

11. The no-liquid cell for lithium slurry battery according to claim 1, wherein
the material of the positive electrode grid is a nonconductive material, and the nonconductive material is selected from the group consisting of polyethylene, polypropylene, polystyrene, polytetrafluoroethylene, polyterephthalate, polyamide, polyimide, polyether nitrile, polymethyl acrylate, polyvinylidene fluoride and modified polyolefin, or a mixture thereof; or,
the material of the positive electrode grid is a conductive metal, and the conductive metal is selected from the group consisting of aluminum, stainless steel and silver, or a mixture thereof; or,
the material of the positive electrode grid is a conductive polymer material, and the conductive polymer material is selected from the group consisting of polyacetylene, polypyrrole and its derivatives, polythiophene and its derivatives, polyaniline and its derivatives, poly-(p-phenylene vinylene) and its derivatives, polyparaphenylene and its derivatives and polyfluorene and its derivatives, or a mixture thereof; or
the material of the positive electrode grid is a composite or mixture of a conductive agent and a polymer matrix material,
the polymer matrix material is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, sodium carboxymethyl cellulose, modified polyolefin, polyacetylene, polypyrrole and its derivatives, polythiophene and its derivatives, polyaniline and its derivatives, poly-(p-phenylene vinylene) and its derivatives, polyparaphenylene and its derivatives and polyfluorene and its derivatives, or a mixture thereof,
wherein the mass percentage of the conductive agent is from 10% to 95%, the conductive agent is selected from the group consisting of carbon black, Ketjenblack, graphene, carbon nanotube, carbon fiber, amorphous carbon, metal conductive particle and metal conductive fiber, or a mixture thereof, and the material of the metal conductive particle or the metal conductive fiber is aluminum, stainless steel or silver; or the material of the positive electrode grid is a polymer material with a conductive metal plating layer, and the conductive metal plating layer is selected from the group consisting of aluminum, stainless steel and silver, or a mixture thereof, and the polymer material is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, sodium carboxymethyl cellulose, modified polyolefin, polyacetylene, polypyrrole and its derivatives, polythiophene and its derivatives, polyaniline and its derivatives, poly-(p-phenylene vinylene) and its derivatives, polyparaphenylene and its derivatives and polyfluorene and its derivatives, or a mixture thereof; or, the material of the positive electrode grid is a flexible conductive metal fabric, carbon blanket, carbon fiber conductive fabric and electric-conductive felt composed of metal wires and organic fibers; the material of the conductive metal and metal wire is aluminum, aluminum alloy, stainless steel and silver; and the organic fiber is selected from the group consisting of natural cotton and linen, dacron, aramid, nylon, polypropylene fiber, polyethylene and polytetrafluoroethylene, or a mixture thereof; or, the material of the positive electrode grid is a flexible metal-wire woven conductive layer, an electric-conductive felt composed of metal wires and organic fibers, inorganic non-metal material or porous organic material, which coated with an electric-conductive coating layer or plated with a metal thin film on the surface, the conductive coating layer is a mixture of a conductive agent and a binder, or a mixture of a conductive agent, a cathode active material and a binder, wherein the mixing manner is adhesive bonding, spraying, evaporation deposition or mechanical pressing, the porous organic material includes natural cotton and linen, dacron, aramid, nylon, polypropylene fiber, polyethylene and polytetrafluoroethylene, the inorganic non-metal material includes glass fiber nonwoven fabric and ceramic fiber paper, the conductive agent is selected from the group consisting of carbon black, Ketjenblack, graphene, carbon nanotube, carbon fiber, amorphous carbon, metal conductive particle and metal conductive fiber, or a mixture thereof, and the material of the metal conductive particles or the metal conductive fiber is aluminum, stainless steel or silver, the binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, and a mixture thereof; or the material of the positive electrode grid is a combination of any two or more of the above.

12. The no-liquid cell for lithium slurry battery according to claim 1, wherein one or more electric-conductive layer within positive electrode grids are provided in the grid unit of the positive electrode grid, and the electric-conductive layer within positive electrode grids are tightly contacted or isolated from each other.

13. The no-liquid cell for lithium slurry battery according to claim 12, wherein the cathode surface current-collecting layer and the electric-conductive layer within positive electrode grid are electron conductive layers that have a through-pore structure and a thickness of 1 to 2000 µm, the through-pore has a pore diameter of 10 to 1000 µm and a porosity of 10% to 90%.

14. The no-liquid cell for lithium slurry battery according to claim 12, wherein the cathode surface current-collecting layer and/or the electric-conductive layer within positive electrode grid is a conductive metal layer, and the conductive metal layer is a metal mesh or a metal wire woven mesh, and the shape of a mesh pore is square, rhombus, rectangle or polygon; or, the conductive metal layer is a foamed metal mesh with through-pore structure; or, the conductive metal layer is a porous metal plate or a porous metal foil; and the material of the conductive metal layer is stainless steel, aluminum or silver; or, the cathode surface current-collecting layer and/or the positive electrode grid conducive layer is a carbon fiber conductive fabric, or electric-conductive felt composed of metal wires and organic fibers; the material of the metal wire is aluminum, aluminum alloy, stainless steel or silver; and the organic fiber is selected from the group consisting of natural cotton and linen, dacron, aramid, nylon, polypropylene fiber, polyethylene and polytetrafluoroethylene, or a mixture thereof; or, the cathode surface current-collecting layer and/or the electric-conductive layer within positive electrode grid is a metal conductive layer, a conductive blanket, an inorganic nonmetal material or a porous organic material, which coated with an electric-conductive coating layer or plated with a metal thin film, the conductive coating layer is a mixture of a conductive agent and a binder, or a mixture of a conductive agent, a cathode active material and a binder, wherein the mixing manner is adhesive bonding, spraying, evaporation deposition or mechanical pressing;

the porous organic material includes natural cotton and linen, dacron, aramid, nylon, polypropylene fiber, polyethylene and polytetrafluoroethylene, the inorganic non-metal material includes glass fiber nonwoven fabric and ceramic fiber paper, the conductive agent is selected from the group consisting of carbon black, Ketjenblack, graphene, carbon nanotube, carbon fiber, amorphous carbon, metal conductive particle and metal conductive fiber, or a mixture thereof, the binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, and a mixture thereof; or the cathode surface current-collecting layer and/or the electric-conductive layer within positive electrode grid is a combination of any two or more of the above.

15. The no-liquid cell for lithium slurry battery according to claim 1, wherein the cathode surface current-collecting layer further comprises a interface-improving layer, and the interface-improving layer is combined on the surface of the cathode surface current-collecting layer by a manner selected from the group consisting of vacuum evaporation deposition, magnetron sputtering, plasma deposition, spraying, adhesive bonding, mechanical pressing, printing and inkjet printing, or a combination thereof, the material of the interface-improving layer comprises a conductive agent and a binder, and the mass ratio of the binder to the conductive agent is 0.5 to 20:99.5 to 80, or the interface-improving layer comprises only the conductive agent, the conductive agent is selected from the group consisting of carbon black, Ketjenblack, graphene, carbon nanotube, carbon fiber, amorphous carbon, metal conductive particles and metal conductive fiber, or a mixture thereof, and the binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof.

16. The no-liquid cell for lithium slurry battery according to claim 1, wherein the electric-conductive cathode layer comprises a first electric-conductive cathode layerelectric-conductive cathode layer and a second electric-conductive cathode layerelectric-conductive cathode layer, and the second electric-conductive cathode layerelectric-conductive cathode layer is provided between the two first electric-conductive cathode layerelectric-conductive cathode layers, the first electric-conductive cathode layer has a thickness of not less than 0.05 mm and not more than 10 mm, and the electric-conductive cathode particles of the first electric-conductive cathode layer are partly or all provided on the surface or in the mesh pores of the cathode surface current-collecting layer; the second electric-conductive cathode layer and the first electric-conductive cathode layer are tightly contacted, and the second electric-conductive cathode layer comprises the electric-conductive cathode particles without adhesive bonding.

17. The no-liquid cell for lithium slurry battery according to claim 3, wherein the negative electrode piece comprises a first anode current-collecting layer, and the first anode current-collecting layer completely covers the surface of the electric-conductive lithium-intercalatable anode layer and tightly contacts with the electric-conductive lithium-intercalatable anode layer; the first anode current-collecting layer is an electron conductive layer having a through-pore structure and a thickness of 1 to 2000 µm, the first anode current-collecting layer has a pore diameter of 10 to 800 µm and a porosity of 10% to 90%.

18. The no-liquid cell for lithium slurry battery according to claim 17, wherein an lithium-intercalatable layer is provided on the surface and/or in the pore of the first anode current-collecting layer, and the lithium-intercalatable layer is an lithium-intercalatable porous layer and/or an lithium-intercalatable foil layer, wherein the lithium-intercalatable porous layer and/or the lithium-intercalatable foil layer has either a single-layer structure or a multi-layer structure, and the material, thickness, and porosity or pore diameter of the through-pore of each layer in the multi-layer structure are either the same or different.

19. The no-liquid cell for lithium slurry battery according to claim 18, wherein the lithium-intercalatable porous layer has a thickness of 0.01 to 2000 µm, the through-pore has a porosity of 30% to 98% and a pore diameter from 10 nm to 2 mm.

20. The no-liquid cell for lithium slurry battery according to claim 18, wherein at least one layer of the lithium-intercalatable porous layers is a porous lithium-intercalatable conductive metal layer,
the porous lithium-intercalatable conductive metal layer is a metal mesh or a metal wire woven mesh, and the shape of a mesh pore is square, rhombus, rectangle or polygon, or,
the porous lithium-intercalatable conductive metal layer is a porous foamed metal layer with porous structure, or,
the porous lithium-intercalatable conductive metal layer is a porous metal plate or a porous metal foil, and
the material of the porous lithium-intercalatable conductive metal layer is aluminum, aluminum lithium alloy, tin-based alloy, lithium silicon alloy or lithium titanium alloy; or, at least one layer of the lithium-intercalatable porous layers is a porous conductive layer coated with lithium-intercalatable material,
the porous conductive layer is a conductive metal layer, and the conductive metal layer is a metal mesh or a metal wire woven mesh, and shape of a mesh pore is square, rhombus, rectangle or polygon; or, the conductive metal layer is a porous foamed metal layer with a porous structure; or, the conductive metal layer is a porous metal plate or a porous metal foil; and the material of the conductive metal layer is stainless steel, nickel, titanium, tin, tin-plated copper or nickel-plated copper, or
the porous conductive layer is a carbon fiber conductive fabric, or electric-conductive felt composed of metal wires and organic fibers, or
the porous conductive layer is a porous organic material coated with an electric-conductive coating layer or plated with a metal thin film, and the porous organic material includes natural cotton and linen, dacron, aramid, nylon, polypropylene fiber, polyethylene and polytetrafluoroethylene; and the lithium-intercalatable material is selected from the group consisting of aluminum-based alloy, silicon-based alloy, tin-based alloy, lithium titanium oxide, lithium silicon oxide, metal lithium powders and graphite, or a mixture thereof; or, at least one layer of the lithium-intercalatable porous layers is a porous mixture of a lithium-intercalatable material, a conductive agent and a binder, or a porous mixture of a lithium-intercalatable material, a conductive agent and a polymer electrolyte layer, and the mass percentage of the conductive agent is not less than 70%, and the mass percentage of the lithium-intercalatable material is not less than 10%, wherein
the material of the lithium-intercalatable material is selected from the group consisting aluminum-based alloy, silicon-based alloy, tin-based alloy, lithium titanium oxide, lithium silicon oxide, metal lithium powders and graphite, or a mixture thereof,
the conductive agent is selected from the group consisting of carbon black, carbon nanotube, carbon fiber, graphene, titanium powder, aluminum powder, silver powder, aluminum alloy powders, stainless steel powders or silver powders, lithium-rich silicon powders, lithium alloy powder-containing metal alloy conductive particles, and lithium-containing carbon material, or a mixture thereof, and the binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof; and the polymer electrolyte layer is a gel polymer electrolyte composite material composed of three parts, i.e., polymer matrix, liquid organic plasticizer and lithium salt; or, at least one layer of the lithium-intercalatable porous layer is a combination of any two or more of the above.

21. The no-liquid cell for lithium slurry battery according to claim 18, wherein the material of the lithium-intercalatable foil layer is a material which can perform a reversible lithium deintercalation reaction and an in situ pulverization during the lithium intercalation-deintercalation reaction; the material of the lithium-intercalatable foil layer is aluminum and aluminum-based alloy, tin and tin-based alloy, zinc and zinc-based alloy and silicon and silicon-based alloy; and the lithium-intercalatable foil layer has a thickness of 0.001 to 1000 μm.

22. The no-liquid cell for lithium slurry battery according to claim 18, wherein the negative electrode piece further comprises one or more second anode current-collecting layers, and the second anode current-collecting layer is provided in one or more positions below: in the electric-conductive lithium-intercalatable anode layer, between two layers of the lithium-intercalatable multi-layer structure, and between the lithium-intercalatable layer and the separating layer.

23. The no-liquid cell for lithium slurry battery according to claim 22, wherein the first anode current-collecting layer and/or the second anode current-collecting layer is a conductive metal layer, and the conductive metal layer is a metal mesh or a metal wire woven mesh, and the shape of the mesh pore is square, rhombus, rectangle or polygon; or, the conductive metal layer is a porous foamed metal layer with a porous structure; or, the conductive metal layer is a porous metal plate or a porous metal foil, and the material of the conductive metal layer is stainless steel, nickel, titanium, tin, tin-plated copper and nickel-plated copper; or, the first anode current-collecting layer and/or the second anode current-collecting layer is a carbon fiber conductive fabric, or an electric-conductive felt composed of metal wires and organic fibers, and the material of the metal wire is stainless steel, nickel, titanium, tin, tin-plated copper or nickel-plated copper; the organic fiber is selected from the group consisting of natural cotton and linen, dacron, aramid, nylon, polypropylene fiber, polyethylene and polytetrafluoroethylene, or a mixture thereof; or, the first anode current-collecting layer and/or the second anode current-collecting layer is a metal conductive layer, a conductive blanket, inorganic nonmetal material or porous organic material, which coated with an electric-conductive coating layer or plated with a metal thin film on the surface, the conductive coating layer is a composite of a conductive agent and a binder, or a composite of a conductive agent, a lithium-intercalatable anode material and a binder, and the combining manner is bonding, spraying, evaporation deposition or mechanical pressing, the porous organic material includes natural cotton and linen, dacron, aramid, nylon, polypropylene fiber, polyethylene and polytetrafluoroethylene, the inorganic nonmetal material includes glass fiber nonwoven fabric and ceramic fiber paper, the material of the conductive thin film is stainless steel, nickel, titanium, tin, tin-plated copper or nickel-plated copper, the conductive agent is selected from the group consisting of carbon black, Ketjenblack, graphene, carbon nanotube, carbon fiber, amorphous carbon, metal conductive particle and metal conductive fiber, or a mixture thereof, the material of the metal conductive particle or the metal conductive fiber is selected from the group consisting of stainless steel, nickel, titanium, tin, tin-plated copper and nickel-plated copper, or a mixture thereof, the binder is selected from the group consisting of polyvinyl chloride, polyethylene, polypropylene, polystyrene, polytetrafluoroethylene, polyterephthalate, polyamide, polyimide, polyether nitrile, polymethyl acrylate, polyvinylidene fluoride, polyurethane, polyacrylonitrile, styrene butadiene rubber, sodium carboxymethyl cellulose and modified polyolefin, or a mixture thereof; or, the first anode current-collecting layer and/or the second anode current-collecting layer is a combination of any two or more of the above.

24. A lithium slurry battery module, wherein the lithium slurry battery module comprises a cell can and one or more series-connected, parallel-connected or series-parallel-connected battery cells disposed in the cell can; the cell can comprises a top lid of the cell can and a lower case of the cell can; the battery cell comprises: a shell of battery cell, which comprises a top lid of the shell and a lower case of the shell, and the top lid of the shell connects with the lower case of the shell to form a battery cell inner chamber;

the no-liquid cell according to claim 1 is provided inside the shell of battery cell;

a positive terminal, and the positive terminal extends out from the shell of battery cell and is fluid sealed with the shell of battery cell, and the positive electrode piece of the no-liquid cell is conductively connected with the positive terminal through a positive electric-conductive connector;

a negative terminal, and the negative terminal extends out from the shell of battery cell and is fluid sealed with the shell of battery cell, and the negative electrode piece of the no-liquid cell is conductively connected with the negative terminal through a negative electrode conductive connector; and a first port and a second port, and the first port and the second port are provided on the shell of battery cell for fluid communication between the inside and outside of the shell.

25. The lithium slurry battery module according to claim 24, wherein the first port is an injection interface and the second port is a discharge interface, and electrolyte, gas or washing liquid can be injected into the shell of battery cell through the injection interface, and electrolyte, gas or washing liquid can be discharged from the battery cell through the discharge interface; or the first port is an injection-discharge interface and the second port is an gas pressure regulating vent, and the electrolyte, gas or washing liquid can be injected into the shell of battery cell through the injection-discharge interface, and the gas in the battery cell can be discharged through the gas pressure regulating vent, or the electrolyte, gas or washing liquid in the battery cell can be discharged through the injection-discharge interface, and the gas can be injected to the battery cell through the gas pressure regulating vent.

26. The lithium slurry battery module according to claim 25, wherein the battery cell further comprises a division plate in cell inner chamber, the division plate in cell inner chamber is disposed on the division plate connecting part of the lower case of the cell, and the division plate in cell inner chamber divides the inner chamber of the battery cell into a first inner chamber of the battery cell and a second inner chamber of the battery cell, and dry gas is provided in the first inner chamber of the battery cell and the second inner chamber of the battery cell, and the no-liquid cell is provided in the second inner chamber of the battery cell, and the injection interface and the discharge interface are in fluid communication with the second inner chamber of the battery cell,
  wherein an gas pressure regulating valve is provided on the top lid of the shell of battery cell, which regulates the gas pressure in the first inner chamber of the battery cell to ensure the gas pressure in the first inner chamber of the battery cell is higher than or equal to the gas pressure in the second inner chamber of the battery cell, and the gas pressure in the first inner chamber of the battery cell is more than one atmosphere pressure, and the dry gas is selected from the group consisting of nitrogen, air, inert gas and sulfur hexafluoride, or a mixture thereof, and the dry gas has a water content of ≤1 ppm.

27. The lithium slurry battery module according to claim 25, wherein the battery cell further comprises an electric-insulating sealing bag, and the no-liquid cell is disposed in the electric-insulating sealing bag and sealed; the no-liquid cell sealed in the electric-insulating sealing bag is disposed inside the shell of battery cell, and the positive electric-conductive connector and the negative electrode conductive connector extend out from the electric-insulating sealing bag; the electric-insulating sealing bag is connected with the injection interface through an input pipe and connected with the discharge interface through an output pipe; and the material of the electric-insulating sealing bag is aluminum plastic composite film.

28. The lithium slurry battery module according to claim 25, wherein the injection interface can quickly connect with or disconnect from the interface of a device for injecting liquid/gas to inject liquid or gas into the battery cell, and the discharge interface can quickly connect with or disconnect from interface of a suction apparatus or collection device to discharge the liquid or gas from the battery cell,
  wherein a discharging pipe is provided in the battery cell, and one end of the discharging pipe connects to the discharge interface and the other end extends to the bottom of the inner chamber of the battery cell, and the discharging pipe is a rigid tube or a soft tube, or the discharging pipe is formed integrally with the shell of battery cell; and
  wherein a sealing cover for the injection interface is provided on the shell of battery cell, and the injection interface and the discharge interface are respectively sealed with the sealing cover for the injection interface.

29. The lithium slurry battery module according to claim 25, wherein the lithium slurry battery module further comprises an integral liquid-exchanging system, and the integral liquid-exchanging system comprises a main injection pipe, a branch injection pipe, a main discharge pipe and a branch discharge pipe,
  the main injection pipe connects with the branch injection pipe and the branch injection pipe connects to the injection interface of the battery cell,
  the main discharge pipe connects with the branch discharge pipe and the branch discharge pipe connects to the discharge interface of the battery cell;
  a main injection port and a main discharge port are provided on the top lid of the cell can of the lithium slurry battery module, and the main injection port is in fluid communication with the main injection pipe and the main discharge port is in fluid communication with the main discharge pipe, and detachable sealing elements or valves for the main injection port and the main discharge port are provided on the main injection port and the main discharge port separately;
  wherein the material of the main injection pipe, branch injection pipe, main discharge pipe and branch discharge pipe is metal material or electrolyte-resistant insulation material, and the metal material is stainless steel or aluminum, and the electrolyte-resistant insulation material is polytetrafluoroethylene, polypropylene or polyethylene;
  wherein the main injection pipe, the branch injection pipe, the main discharge pipe and the branch discharge pipe are rigid pipes or soft pipes; or wherein the main injection pipe, the branch injection pipe, the main discharge pipe and the branch discharge pipe can be integrally formed with the top lid of the cell can.

30. The lithium slurry battery module according to claim 25, wherein after injecting electrolyte inside the shell of battery cell through the injection interface, the battery cell inner chamber is between the top lid of the cell and the liquid level of the electrolyte inside the shell of battery cell, wherein the dry gas is provided in the inner chamber of the cell can and/or the battery cell inner chamber, and the gas pressure in the inner chamber of the cell can is higher than or equal to the gas pressure in the battery cell inner chamber, and the gas pressure in the inner chamber of the cell can is more than one atmosphere pressure, and the dry gas is selected from the group consisting of nitrogen, air, inert gas and sulfur hexafluoride, or a mixture thereof, and the dry gas has a water content of ≤0.1 ppm.

31. The lithium slurry battery module according to claim 30, wherein an exhaust port of the battery cell shell is provided on the top lid of the battery cell shell, and an exhaust valve is provided on the exhaust port of the battery cell shell,
  an exhaust port of the cell can is provided on the cell can and an exhaust valve is provided on the cell can exhaust port,
  the exhaust port of the shell is connected to the exhaust port of the cell can with a branch exhaust pipe and a main exhaust pipe, when the gas pressure in the battery cell inner chamber is higher than the predetermined value, the gas in the battery cell inner chamber enters the branch exhaust pipe through the exhaust valve on the exhaust port of shell of battery cell, and when the gas pressure in the main exhaust pipe is higher than the predetermined value, the gas in the main exhaust pipe discharges to the atmosphere or a gas-collecting device through the exhaust valve on the exhaust port of the cell can.

32. The lithium slurry battery module according to claim 30, wherein the exhaust port of the shell is provided on the top lid of the shell, and the exhaust valve is provided on the exhaust port of the shell, when the gas pressure in the inner chamber of the battery cell is higher than the gas pressure in the inner chamber of the cell can, the gas in the inner chamber of the battery cell is discharged to the inner chamber of the cell can through the exhaust valve; and the exhaust port of the cell can is provided on the top lid of the cell can and the gas pressure regulating valve is provided on the exhaust port of the cell can, when the gas pressure in the inner chamber of the cell can is higher than the maximum predetermined value, the gas in the inner chamber of the cell can is discharged to the atmosphere or the gas-collecting device through the gas pressure regulating valve, and when the gas pressure in the inner chamber of the cell can is less than the minimum predetermined valve, the gas is injected to the inner chamber of the cell can through the gas pressure regulating valve.

33. The lithium slurry battery module according to claim 30, wherein a top lid detachable connecting part is provided on the top lid of the battery cell shell, and a lower case detachable connecting part is provided on the lower case of the shell, and with the gas pressure difference between the inner chamber of the cell can and the inner chamber of the battery cell shell, the top lid detachable connecting part and the lower case detachable connecting part can be tightly connected; and the connection mode between the top lid detachable connecting part of the top lid of the shell and the lower case detachable connecting part of the lower case of the shell is snapping, bolting or bonding, and at least one sealing ring is provided between the top lid detachable connecting part of the top lid of the shell and the lower case detachable connecting part of the lower case of the shell of battery cell.

34. The lithium slurry battery module according to claim 33, wherein electrolyte, electrolyte solvent or liquid flame retardant is provided in the inner chamber of the cell can, and the liquid level of the liquid is higher than the top lid detachable connecting part of the top lid of the shell of battery cell.

35. The lithium slurry battery module according to claim 24, wherein a top lid detachable connecting part is provided on the top lid of the cell can, and a lower case detachable connecting part is provided on the lower case of the cell can, and the top lid detachable connecting part of the top lid of the cell can connects to the lower case detachable connecting part of the lower case of the cell can through snapping, bolting or bonding, and at least one sealing ring is provided between the top lid detachable connecting part of the top lid of the cell can and the lower case detachable connecting part of the lower case of the cell can.

36. The lithium slurry battery module according to claim 24, wherein both the top lid of the shell and the lower case of the shell have a nested structure, and the inside of the nested structure is electrolyte-resistant insulation material and the outside of the nested structure is metal material; or the material of the top lid of the shell and the lower case of the shell is metal material or electrolyte-resistant insulation material; and the metal material is stainless steel or aluminum, and the electrolyte-resistant insulation material is polytetrafluoroethylene, polypropylene or polyethylene.

37. The lithium slurry battery module according to claim 24, wherein the material of the top lid of the cell can and/or the lower case of the cell can is selected from the group consisting of polytetrafluoroethylene, polypropylene, polyethylene, ABS plastic, stainless steel, aluminum and aluminum alloy, or a mixture thereof.

* * * * *